United States Patent
Nakamura

(10) Patent No.: US 9,277,220 B2
(45) Date of Patent: Mar. 1, 2016

(54) IMAGE CODING APPARATUS INCLUDING A GEOMETRIC-TRANSFORMATION MOTION COMPENSATION PREDICTION UNIT UTILIZING AT LEAST TWO PREDICTION MODES OUT OF FOUR PREDICTION MODES

(71) Applicant: JVC KENWOOD Corporation, Yokohama-shi (JP)

(72) Inventor: Hiroya Nakamura, Yokosuka (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 739 days.

(21) Appl. No.: 13/683,812

(22) Filed: Nov. 21, 2012

(65) Prior Publication Data

US 2013/0148734 A1    Jun. 13, 2013

Related U.S. Application Data

(63) Continuation of application No. PCT/JP2011/002514, filed on Apr. 28, 2011.

(30) Foreign Application Priority Data

| May 21, 2010 | (JP) | 2010-117156 |
| May 21, 2010 | (JP) | 2010-117157 |
| Mar. 28, 2011 | (JP) | 2011-070981 |
| Mar. 28, 2011 | (JP) | 2011-070982 |

(51) Int. Cl.
*H04N 7/12* (2006.01)
*H04N 19/50* (2014.01)
*H04N 19/105* (2014.01)
(Continued)

(52) U.S. Cl.
CPC ....... *H04N 19/00569* (2013.01); *H04N 19/105* (2014.11); *H04N 19/182* (2014.11); *H04N 19/51* (2014.11); *H04N 19/513* (2014.11); *H04N 19/517* (2014.11); *H04N 19/593* (2014.11)

(58) Field of Classification Search
CPC ........................... H04N 19/105; H04N 19/182
See application file for complete search history.

(56) References Cited

FOREIGN PATENT DOCUMENTS

| JP | 08-065680 | 3/1996 |
| JP | 08-079759 | 3/1996 |

(Continued)

OTHER PUBLICATIONS

Notification of Reasons for Refusal in Japanese Patent Application No. 2011-070981, dated Sep. 24, 2014.

(Continued)

*Primary Examiner* — Young Lee
(74) *Attorney, Agent, or Firm* — Venable LLP; Michael A. Sartori

(57) ABSTRACT

A geometric-transformation motion compensation prediction unit calculates, for each of a plurality of prediction modes, a motion vector and a prediction signal between a target block in a target image and a reference block in a reference image obtained by performing geometric transformation on the target block, selects pixels located at vertices constituting the target block, pixels located near the vertices, or interpolation pixels located near the vertices as representative pixels corresponding to the vertices in each prediction mode, calculates the respective motion vectors of these representative pixels, and calculates the respective motion vectors of pixels other than the representative pixels by interpolation using the motion vectors of the representative pixels so as to calculate the prediction signal.

14 Claims, 15 Drawing Sheets

(51) Int. Cl.
*H04N 19/182* (2014.01)
*H04N 19/51* (2014.01)
*H04N 19/513* (2014.01)
*H04N 19/517* (2014.01)
*H04N 19/593* (2014.01)

(56) References Cited

FOREIGN PATENT DOCUMENTS

| JP | 08-079763 | 3/1996 |
| JP | 09-172644 | 6/1997 |
| JP | 09-200770 | 7/1997 |

OTHER PUBLICATIONS

Notification of Reasons for Refusal in Japanese Patent Application No. 2011-070982, dated Sep. 24, 2014.
First Office Action in Chinese Patent Application No. 201180025300.X, dated Apr. 3, 2015.
International Search Report in PCT International Application No. PCT/JP2011/002514, dated Jul. 19, 2011.
International Preliminary Report on Patentability and Written Opinion in PCT International Application No. PCT/JP2011/002514 dated Dec. 10, 2012.

MACROBLOCK PARTITION

SUB-MACROBLOCK PARTITION

| macroblock_layer( ) { |
|---|
| mb_type |
| geom_type |
| ............ |
| mb_pred( mb_type, geom_type ) |

| mb_pred( mb_type, geom_type ) { |
|---|
| ............ |
| for( mbPartIdx = 0; mbPartIdx < NumMbPart( mb_type, geom_type ); mbPartIdx++) |
|   if( MbPartPredMode ( mb_type, mbPartIdx ) != Pred_L1 ) |
|     for( compIdx = 0; compIdx < 2; compIdx++ ) |
|       mvd_l0[ mbPartIdx ][ 0 ][ compIdx ] |
| for( mbPartIdx = 0; mbPartIdx < NumMbPart( mb_type, geom_type ); mbPartIdx++) |
|   if( MbPartPredMode ( mb_type, mbPartIdx ) != Pred_L0 ) |
|     for( compIdx = 0; compIdx < 2; compIdx++ ) |
|       mvd_l1[ mbPartIdx ][ 0 ][ compIdx ] |

FIG.15
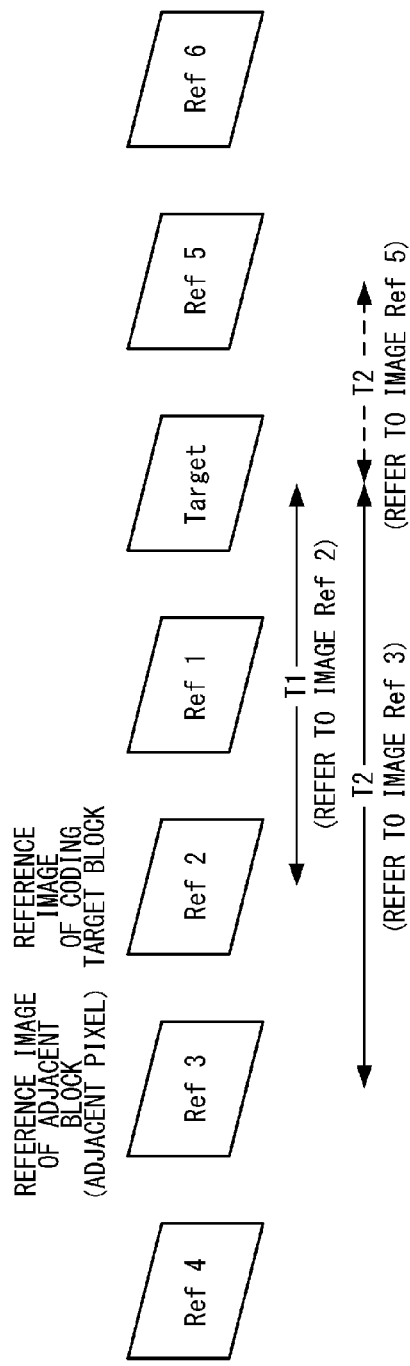
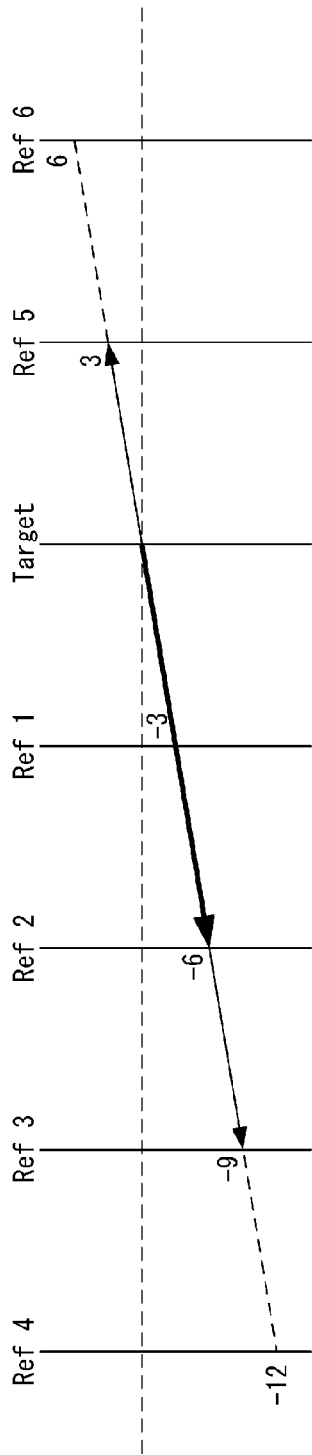

IMAGE CODING APPARATUS INCLUDING A GEOMETRIC-TRANSFORMATION MOTION COMPENSATION PREDICTION UNIT UTILIZING AT LEAST TWO PREDICTION MODES OUT OF FOUR PREDICTION MODES

CROSS REFERENCE TO RELATED APPLICATION

This patent application claims priority based on a PCT application, PCT/JP2011/002514 filed on 28 Apr. 2011, the contents of which are incorporated herein by reference.

BACKGROUND OF THE INVENTION

1. Field of the Invention

The present invention relates to an image coding apparatus, an image coding method, and an image coding program that allow for the encoding of images using motion compensation prediction and to an image decoding apparatus, an image decoding method, and an image decoding program that allow for the decoding of images using motion compensation prediction.

2. Description of the Related Art

As a representative example of a video compression coding method, the MPEG series standard is used. In the MPEG series standard, motion compensation is used where a frame is divided into a plurality of blocks and motion from another frame is predicted. In MPEG-4 and AVC/H.264, a mechanism is introduced where the best size among a plurality of motion compensation block sizes is interchangeably used.

In motion compensation prediction in units of blocks, a method for compensating parallel translation between a target block and a reference block is generally used. In addition, a method for compensating transformation of blocks (e.g., enlargement, reduction, and rotation) is under consideration. For example, in Patent document 1, prediction efficiency is improved by adaptively switching between a mode for obtaining a prediction image by parallel translation and a mode for obtaining a prediction image by geometric transformation as an image coding method in which inter-frame prediction is used. It is stated that a motion vector of parallel translation and a motion vector of a lattice point (i.e., a motion vector used in geometric transformation) are coded in this method.

[Patent document 1] JP H8-65680

Under these circumstances, the inventors of the present invention have found a technique for further compressing the entire coding amount by compressing motion vector information using an image coding method in which motion compensation prediction by geometric transformation is used.

SUMMARY OF THE INVENTION

In this background, a purpose of the present invention is to provide a technology for improving the efficiency of coding amount compression by an image coding method in which motion compensation prediction by geometric transformation is used.

An image coding apparatus according to one embodiment of the present invention is an image coding apparatus for coding a video image comprising: a geometric-transformation motion compensation prediction unit configured to calculate, for each of a plurality of prediction modes, a motion vector and a prediction signal between a target block in a target image and a reference block in a reference image obtained by performing geometric transformation on the target block, to select pixels located at vertices constituting the target block, pixels located near the vertices, or interpolation pixels located near the vertices as representative pixels corresponding to the vertices in each prediction mode, to calculate the respective motion vectors of these representative pixels, and to calculate the respective motion vectors of pixels other than the representative pixels by interpolation using the motion vectors of the representative pixels so as to calculate the prediction signal; a prediction method determination unit configured to select any one of the plurality of prediction modes by the geometric-transformation motion compensation prediction unit for each target block in the target image; a prediction error signal generation unit configured to calculate a difference between a prediction signal calculated in a prediction mode selected by the prediction method determination unit and an image signal of the target block so as to generate a prediction error signal; a difference vector generation unit configured to calculate, using motion vectors inside and outside of the target block, prediction motion vectors of the respective motion vectors of the representative pixels calculated in the prediction mode selected by the prediction method determination unit and to calculate differences between the prediction motion vectors and the motion vectors of the representative pixels calculated in the selected prediction mode so as to generate respective difference motion vectors of the representative pixels; and a coding unit configured to code prediction method information for identifying the prediction mode selected by the prediction method determination unit, the difference motion vectors generated by the difference vector generation unit, and the prediction error signal generated by the prediction error signal generation unit.

Another embodiment of the present invention also relates to an image coding apparatus. The apparatus is an image coding apparatus for coding a video image comprising: a geometric-transformation motion compensation prediction unit configured to calculate, in accordance with a prediction mode, a motion vector and a prediction signal between a target block in a target image and a reference block in a reference image obtained by performing geometric transformation on the target block, to select pixels located at vertices constituting the target block, pixels located near the vertices, or interpolation pixels located near the vertices as representative pixels corresponding to the vertices in the calculation, to calculate the respective motion vectors of these representative pixels, and to calculate the respective motion vectors of pixels other than the representative pixels by interpolation using the motion vectors of the representative pixels so as to calculate the prediction signal; a prediction error signal generation unit configured to calculate a difference between a prediction signal calculated by the geometric-transformation motion compensation prediction unit and an image signal of the target block so as to generate a prediction error signal; a difference vector generation unit configured to calculate, using motion vectors inside and outside of the target block, prediction motion vectors of the respective motion vectors of the representative pixels calculated by the geometric-transformation motion compensation prediction unit and to calculate differences between the prediction motion vectors and the motion vectors of the representative pixels calculated so as to generate respective difference motion vectors of the representative pixels; and a coding unit configured to code the difference motion vectors generated by the difference vector generation unit and the prediction error signal generated by the prediction error signal generation unit.

An image decoding apparatus according to one embodiment of the present invention comprises: a decoding unit configured to decode prediction method information for identifying a prediction mode, difference motion vectors of respective representative pixels according to the prediction mode, and a prediction error signal, which are included in a coded stream coded using motion compensation prediction by geometric transformation; a motion vector generation unit configured to calculate, using motion vectors inside and outside of the target block, prediction motion vectors of the respective motion vectors of the representative pixels in accordance with the prediction mode identified by the prediction method information and to generate the respective motion vectors of the representative pixels by adding respective difference motion vectors of the representative pixels to the respective prediction motion vectors; a geometric-transformation motion compensation prediction unit configured to generate a prediction signal from respective motion vectors of the representative pixels between the target block in a target image and a reference block in a reference image obtained by performing geometric transformation on the target block, from respective motion vectors of pixels other than the representative pixels calculated by interpolation using the motion vectors of the representative pixels, and from an image signal of the reference block; and an image signal generation unit configured to generate an image signal from the prediction signal and the prediction error signal decoded by the decoding unit. Pixels located at vertices constituting the target block, pixels located near the vertices, or interpolation pixels located near the vertices are selected as the representative pixels.

Another embodiment of the present invention also relates to an image decoding apparatus. The apparatus comprises: a decoding unit configured to decode difference motion vectors of respective representative pixels and a prediction error signal, which are included in a coded stream coded using motion compensation prediction by geometric transformation; a motion vector generation unit configured to calculate, using motion vectors inside and outside of the target block, prediction motion vectors of the respective motion vectors of the representative pixels and to generate the respective motion vectors of the representative pixels by adding respective difference motion vectors of the representative pixels to the respective prediction motion vectors; a geometric-transformation motion compensation prediction unit configured to generate a prediction signal from respective motion vectors of the representative pixels between the target block in a target image and a reference block in a reference image obtained by performing geometric transformation on the target block, from respective motion vectors of pixels other than the representative pixels calculated by interpolation using the motion vectors of the representative pixels, and from an image signal of the reference block; and an image signal generation unit configured to generate an image signal from the prediction signal and the prediction error signal decoded by the decoding unit. Pixels located at vertices constituting the target block, pixels located near the vertices, or interpolation pixels located near the vertices are selected as the representative pixels.

Optional combinations of the aforementioned constituting elements and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 3 is a diagram (1) explaining representative pixels corresponding to four vertices of a target block;

FIG. 4 is a diagram illustrating an example of a syntax structure;

FIG. 15 is a diagram for explaining an example of a process of scaling a motion vector value.

DETAILED DESCRIPTION OF THE INVENTION

The invention will now be described by reference to the preferred embodiments. This does not intend to limit the scope of the present invention, but to exemplify the invention.

A description will be given of embodiments of the present invention with reference to the drawings. An explanation is given where coding and decoding are performed based on AVC/H.264 coding method in the following embodiments.

Figure 1:
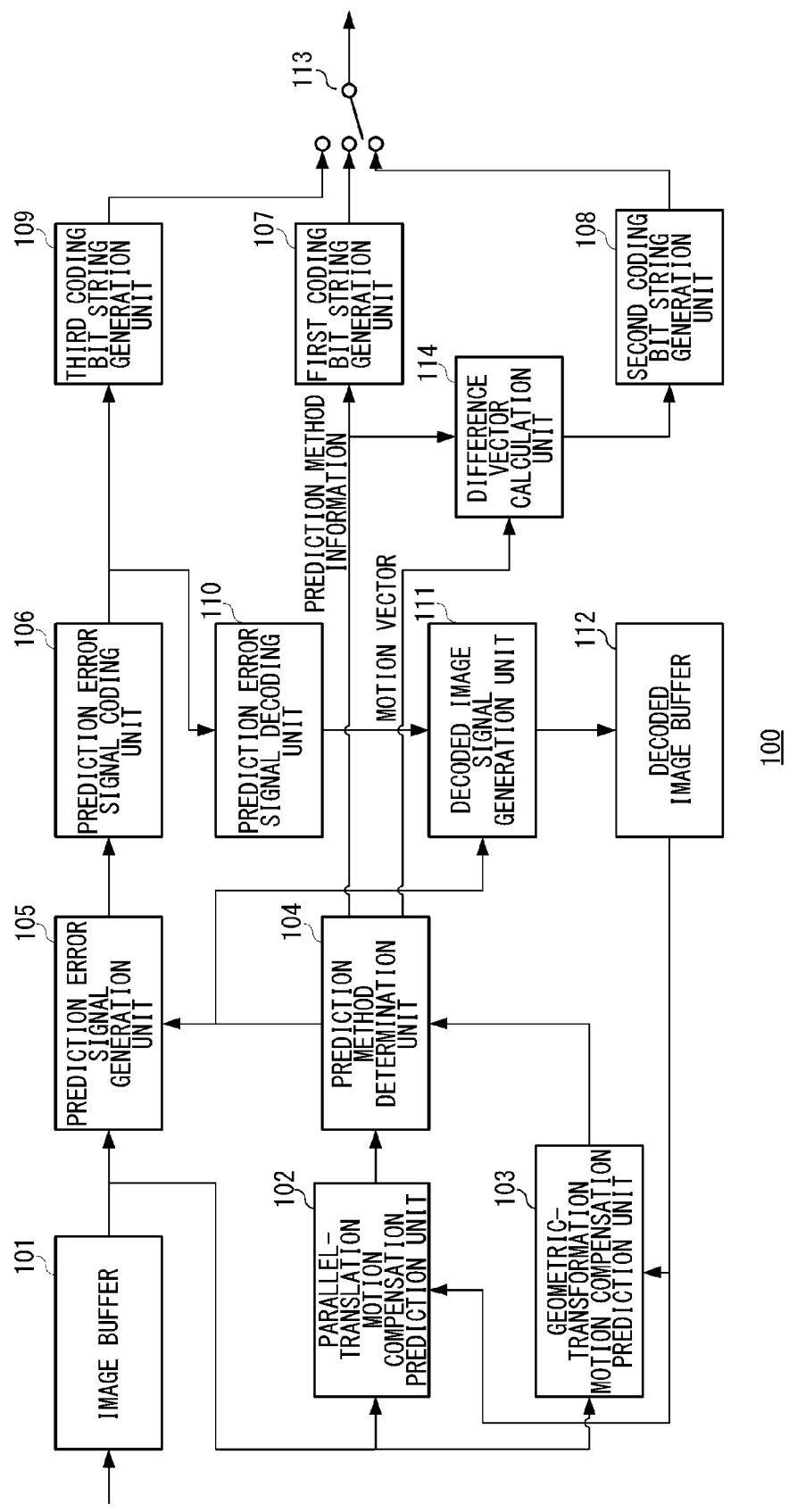
FIG. 1 is a block diagram illustrating the configuration of an image coding apparatus according to a first embodiment of the present invention.

FIG. 1 is a block diagram illustrating the configuration of an image coding apparatus 100 according to a first embodiment of the present invention. The image coding apparatus 100 includes an image buffer 101, a parallel-translation motion compensation prediction unit 102, a geometric-transformation motion compensation prediction unit 103, a prediction method determination unit 104, a prediction error signal generation unit 105, a prediction error signal coding unit 106, a first coding bit string generation unit 107, a second coding bit string generation unit 108, a third coding bit string generation unit 109, a prediction error signal decoding unit 110, a decoded image signal generation unit 111, a decoded image buffer 112, and an output switch 113.

The configuration thereof is implemented by hardware such as a processor, a memory, or other LSIs and by software such as a program or the like loaded into the memory. The figure depicts functional blocks implemented by the cooperation of hardware and software. Thus, a person skilled in the art should appreciate that there are many ways of accomplishing these functional blocks in various forms in accordance with the components of hardware only, software only, or the combination of both.

The image buffer 101 temporarily stores a coding target image signal provided in order of image-capturing/display time. The image buffer 101 provides the stored coding target image signal to the parallel-translation motion compensation prediction unit 102, the geometric-transformation motion compensation prediction unit 103, and the prediction error signal generation unit 105 in parallel in units of predetermined pixel blocks (in units of macroblocks in this case). The image provided in order of image-capturing/display time is reordered in order of coding and output from the image buffer 101 at that time.

In the MPEG series, a macroblock refers to a block including a luminance signal of 16×16 pixels and two corresponding color-difference signals. When the YUV of a color-difference format is 4:2:0, the size of a color-difference signal is 8×8 pixels.

In the present embodiment, an intra-coding system where coding is performed in a screen without using a reference image, a motion compensation prediction system by parallel translation using a reference image, and a motion compensation prediction system by geometric transformation using a reference image are used. A reference image refers to a decoded image that is locally decoded. The configuration of the intra-coding system is omitted in FIG. 1 since the intra-coding system is not taken notice of in the present embodiment. These coding system modes are adaptively switched alone or in combination thereof in units of macroblocks. It is also possible to employ a system where all macroblocks are coded using the motion compensation prediction system by geometric transformation.

The parallel-translation motion compensation prediction unit 102 performs motion compensation prediction by parallel translation between a coding target macroblock signal provided from the image buffer 101 and a reference image signal provided from the decoded image buffer 112. The parallel-translation motion compensation prediction unit 102 generates a motion vector and a prediction signal between a target block in a target image according to each mode and a reference block in a reference image translated from the target block and provides the motion vector and the prediction signal to the prediction method determination unit 104. In the present embodiment, the parallel-translation motion compensation prediction unit 102 performs motion compensation prediction by parallel translation that is similar to existing motion compensation prediction defined in the AVC/H.264 method or the like.

In the motion compensation prediction, a previous or subsequent decoded image is used as a reference image in display order provided from the decoded image buffer 112, which is described later. The parallel-translation motion compensation prediction unit 102 performs block matching between a macroblock signal provided from the image buffer 101 and a reference image signal provided from the decoded image buffer 112 within a predetermined detection range in the reference image. The parallel-translation motion compensation prediction unit 102 specifies a reference block signal in the reference image signal that is the least different from the macroblock signal and detects a motion vector between the macroblock signal and the reference block signal.

The block matching is performed in a plurality of defined modes. A reference index, the size of a motion prediction block, L0/L1/bi-predictive prediction, and the like are different in each of the plurality of modes. The reference index is an index that shows a reference picture. The L0/L1/bi-predictive prediction is selectable only in a B-slice. The L0 prediction and the L1 prediction are unidirectional prediction where prediction is conducted in a unidirection. The L0 prediction is prediction where information such as a motion vector and the like of L0 is used, and the L1 prediction is prediction where information such as a motion vector and the like of L1 is used. The bi-predictive prediction is bi-directional prediction where prediction is conducted based on two reference images using the information such as a motion vector and the like of L0 and the information such as a motion vector and the like of L1. A specific example of a block size will be later described in detail.

Motion compensation can be performed with pixel accuracy of less than one pixel when performing the motion compensation prediction. For example, in the AVC/H.264 method and the like, motion compensation can be performed up to the accuracy of ¼ of a pixel for a luminance signal and up to the accuracy of ⅛ of a pixel for a color-difference signal. When performing motion compensation with the pixel accuracy of less than one pixel, a signal of the pixel accuracy of less than one pixel is generated by interpolation from a surrounding signal of an integer pixel in the reference image.

The parallel-translation motion compensation prediction unit 102 performs motion compensation in each mode and provides a prediction signal (more specifically, a motion compensation prediction block signal) and a motion vector in each mode to the prediction method determination unit 104.

Subsequently, an explanation is given regarding a motion compensation block size in the AVC/H.264 method.

FIGS. 2A-2H are diagrams explaining macroblock partitions and sub-macroblock partitions. In order to simplify the explanation, only pixel blocks of a luminance signal are depicted. In the MPEG series, a macroblock is defined by a square region. Generally, in the MPEG series including the AVC/H.264 method, a block defined by 16×16 pixels (16 pixels horizontally and 16 pixels vertically) is referred to as a microblock. Further, in the AVC/H.264 method, a block defined by 8×8 pixels is referred to as a sub-macroblock. A macroblock partition is each small block obtained by further dividing a macroblock for motion compensation prediction. A sub-macroblock partition is each small block obtained by further dividing a sub-macroblock for motion compensation prediction.

Figure 2D:
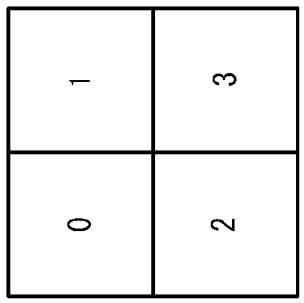
FIGS. 2A-2H are diagrams explaining macroblock partitions and sub-macroblock partitions.
Figure 2C:
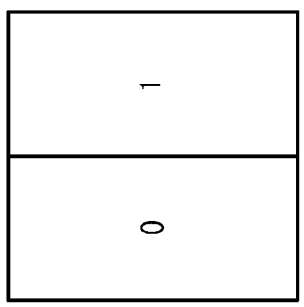
Figure 2B:
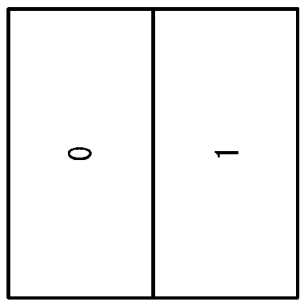
Figure 2A:
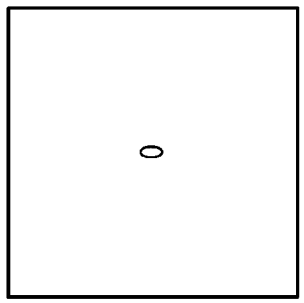

FIG. 2A is a diagram showing that a macroblock comprises a single macroblock partition composed of a luminance signal of 16×16 pixels and two corresponding color-difference signals. This configuration is referred to as a macroblock type of a 16×16 mode.

FIG. 2B is a diagram showing that a macroblock comprises two macroblock partitions each composed of a luminance signal of 16×8 pixels (16 pixels horizontally and 8 pixels vertically) and two corresponding color-difference signals. The two macroblock partitions are vertically arranged. This configuration is referred to as a macroblock type of a 16×8 mode.

FIG. 2C is a diagram showing that a macroblock comprises two macroblock partitions each composed of a luminance signal of 8×16 pixels (8 pixels horizontally and 16 pixels vertically) and two corresponding color-difference signals.

The two macroblock partitions are horizontally arranged. This configuration is referred to as a macroblock type of an 8×16 mode.

FIG. 2D is a diagram showing that a macroblock comprises four macroblock partitions each composed of a luminance signal of 8×8 pixels and two corresponding color-difference signals. The four macroblock partitions are arranged such that two macroblock partitions are vertically arranged and two macroblock partitions are horizontally arranged. This configuration is referred to as a macroblock type of an 8×8 mode.

Figure 2H:
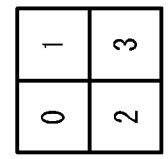
Figure 2G:
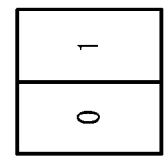
Figure 2F:
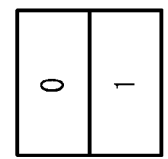
Figure 2E:
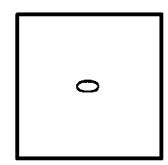

FIG. 2E is a diagram showing that a sub-macroblock comprises a single sub-macroblock partition composed of a luminance signal of 8×8 pixels and two corresponding color-difference signals. This configuration is referred to as a sub-macroblock type of an 8×8 mode.

FIG. 2F is a diagram showing that a sub-macroblock comprises two sub-macroblock partitions each composed of a luminance signal of 8×4 pixels (8 pixels horizontally and 4 pixels vertically) and two corresponding color-difference signals. The two sub-macroblock partitions are vertically arranged. This configuration is referred to as a sub-macroblock type of an 8×4 mode.

FIG. 2G is a diagram showing that a sub-macroblock comprises two sub-macroblock partitions each composed of a luminance signal of 4×8 pixels (4 pixels horizontally and 8 pixels vertically) and two corresponding color-difference signals. The two sub-macroblock partitions are horizontally arranged. This configuration is referred to as a sub-macroblock type of a 4×8 mode.

FIG. 2H is a diagram showing that a sub-macroblock comprises four sub-macroblock partitions each composed of a luminance signal of 4×4 pixels and two corresponding color-difference signals. The four sub-macroblock partitions are arranged such that two sub-macroblock partitions are vertically arranged and two sub-macroblock partitions are horizontally arranged. This configuration is referred to as a sub-macroblock type of a 4×4 mode.

In the AVC/H.264 coding method, a mechanism is adopted where the best size among the above motion compensation block sizes is interchangeably used. As a motion compensation block size in units of macroblocks, any one of the macroblock types of 16×16, 16×8, 8×16, and 8×8 modes is first selected. When the macroblock type of an 8×8 mode is selected, any one of the sub-macroblock types of 8×8, 8×4, 4×8, and 4×4 modes is selected as a motion compensation block size in units of sub-macroblocks.

A luminance signal is motion compensated in the number of pixels of a selected size. When the color-difference format is 4:2:0, a color-difference signal is motion compensated in half the number of the pixels both horizontally and vertically. As described, information regarding a motion compensation block size is coded by syntax elements called macroblock type and sub-macroblock type. Syntax is a rule for expressing a coding bit string, and a syntax element is information defined to be transmitted in syntax.

In all macroblock types of 16×16, 16×8, 8×16, and 8×8 modes, one motion vector is detected for each macroblock partition. In other words, one motion vector is detected in the macroblock type of a 16×16 mode, two motion vectors are detected in the macroblock types of 16×8 and 8×16 modes, and four motion vectors are detected in the macroblock type of an 8×8 mode.

The pixels of a luminance signal and the pixels of a color-difference signal for each macroblock partition are motion compensated according to one motion vector of the macroblock partition. In other words, the pixels are motion compensated using the same motion vector.

Referring back to FIG. 1, the geometric-transformation motion compensation prediction unit 103 performs motion compensation prediction by, in addition to parallel translation between a coding target macroblock signal provided from the image buffer 101 and a reference image signal provided from the decoded image buffer 112, geometric transformation that involves transformation including enlargement, reduction, rotation, or the like. The geometric-transformation motion compensation prediction unit 103 generates a motion vector and a prediction signal between a target block in a target image according to each mode and a reference block in a reference image obtained by performing geometric transformation on the target block and provides the motion vector and the prediction signal to the prediction method determination unit 104. More specifically, the geometric-transformation motion compensation prediction unit 103 selects, as representative pixels, pixels located at vertices constituting the target block, pixels located near the vertices, or interpolation pixels located near the vertices and calculates respective motion vectors of the representative pixels. Since the target block is a quadrangle (e.g., square, rectangle) region, the number of the vertices of the region is four. Therefore, there are four representative pixels. The geometric-transformation motion compensation prediction unit 103 then calculates respective motion vectors of pixels other than the representative pixels by interpolation using the motion vectors of the representative pixels. According to the motion vector of each of these pixels, the geometric-transformation motion compensation prediction unit 103 predicts a prediction signal for each pixel.

The geometric-transformation motion compensation prediction unit 103 is capable of executing a first mode for coding and/or decoding the respective motion vectors of the four representative pixels of the target block, a second mode for coding and/or decoding the respective motion vectors of two representative pixels in the vertical direction of the target block, a third mode for coding and/or decoding the respective motion vectors of two representative pixels in the horizontal direction of the target block, and a fourth mode for coding and/or decoding the respective motion vectors of three representative pixels of the target block. The geometric-transformation motion compensation prediction unit 103 does not always have to execute a plurality of modes. The geometric-transformation motion compensation prediction unit 103 may fixedly use one mode or be provided with one mode according to the processing ability and the frequency of occurrence of each mode. The geometric-transformation motion compensation prediction unit 103 may execute at least two modes among the four modes (may be provided with at least two modes). In these cases, the amount of computation and the amount of coding of information for identifying each mode can be reduced.

Regarding the explanation of the present embodiment, an explanation is given on the condition that the target block is a macroblock of 16×16 pixels. However, the size of the target block is not limited to 16×16 pixels. The target block may be a sub-macroblock of 8×8 pixels or a block of 32×32 pixels, 48×48 pixels, 64×64 pixels, 128×128 pixels, or the like. Regarding the explanation of the present embodiment, an explanation is given on the condition that the target block is a square macroblock. However, the shape of the target block is not limited to a square. The target block may be a macroblock partition of 16×8 pixels or 8×16 pixels, a sub-macroblock partition of 8×4 pixels or 4×8 pixels, or a block of 32×16 pixels, 16×32 pixels, or the like.

The prediction method determination unit 104 can employ any one of the first mode, the second mode, the third mode, and the fourth mode as a prediction method by the geometric-transformation motion compensation prediction unit 103. Details of the process of the prediction method determination unit 104 will be described later.

A detailed description is given of the geometric-transformation motion compensation prediction unit 103 in the following. The geometric-transformation motion compensation prediction unit 103 performs motion compensation prediction by, in addition to parallel translation, geometric transformation that involves transformation including enlargement, reduction, rotation, or the like that is different from existing motion compensation prediction by parallel translation defined by the AVC/H.264 method.

In the motion compensation prediction by geometric transformation according to the present embodiment, the respective pixels of luminance signals and color-difference signals of a macroblock, a macroblock partition, and a sub-macroblock are not motion compensated by the same motion vector. A different motion vector is generated for each pixel so as to perform motion compensation. The geometric-transformation motion compensation prediction unit 103 selects pixels at vertices of each macroblock, pixels near the vertices, or interpolation pixels near the vertices to be representative pixels and obtains respective motion vectors thereof.

Figure 3:
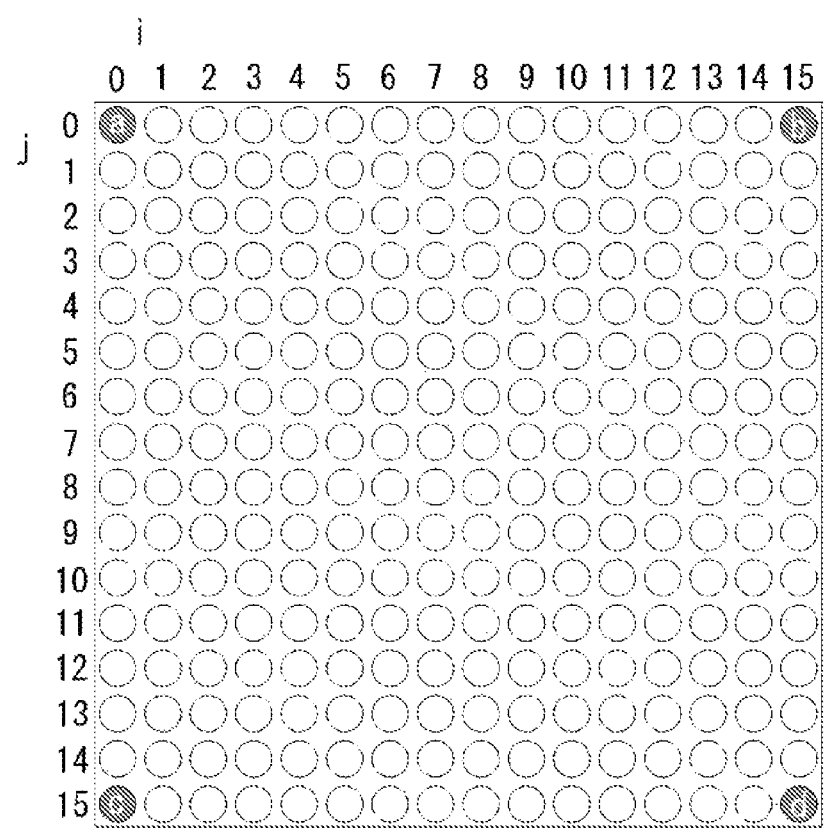

FIG. 3 is a diagram (1) explaining representative pixels corresponding to four vertices of a target block. The upper left vertex or the vicinity of the vertex of the target block is set to be a vertex a. The upper right vertex or the vicinity of the vertex of the target block is set to be a vertex b. The lower left vertex or the vicinity of the vertex of the target block is set to be a vertex c. The lower right vertex or the vicinity of the vertex of the target block is set to be a vertex d. In an example shown in FIG. 3, pixels a, b, c, and d located respectively at an upper left vertex, an upper right vertex, a lower left vertex, and a lower right vertex are set to be representative pixels a, b, c, and d, respectively. In FIG. 3, the representative pixels and non-representative pixels are shown by filled circles and open circles, respectively, and the representative pixels are set to be the pixel a (0,0), the pixel b (W,0), the pixel c (0,H), and the pixel d (W,H) that exist at the vertices of the target block (a macroblock of 16×16 pixels in FIG. 3). W represents a distance (unit is a pixel) between representative pixels in the horizontal direction (between the pixel a and the pixel b and between the pixel c and the pixel d), and H represents a distance (unit is a pixel) between representative pixels in the vertical direction (between the pixel a and the pixel c and between the pixel b and the pixel d). In the setting of the representative pixels shown in FIG. 3, W is 15 (pixels), and H is 15 (pixels). In the present specification, the coordinates of each pixel are shown by (i,j) where the coordinate in the horizontal direction is shown by i in units of one pixel and the coordinate in the vertical direction is shown by j in units of one pixel. The coordinates of the upper left pixel of the target block are set to be the original point (0,0).

In the first mode for coding and/or decoding respective motion vectors of four representative pixels (a first representative pixel a, a second representative pixel b, a third representative pixel c, and a fourth representative pixel d), the respective motion vectors of the four representative pixels are detected. In the second mode for coding and/or decoding respective motion vectors of two representative pixels in the vertical direction (the first representative pixel a and the third representative pixel c), the respective motion vectors of the two representative pixels are detected. In the third mode for coding and/or decoding respective motion vectors of two representative pixels in the horizontal direction (the first representative pixel a and the second representative pixel b), the respective motion vectors of the two representative pixels are detected. In the forth mode for coding and/or decoding respective motion vectors of three representative pixels (the first representative pixel a, the second representative pixel b, and the third representative pixel c), the respective motion vectors of the three representative pixels are detected.

The geometric-transformation motion compensation prediction unit 103 may use a motion vector calculated in units of pixels by an optical flow method or the like, as a motion vector of a representative pixel of each macroblock. Alternatively, the geometric-transformation motion compensation prediction unit 103 may use a motion vector corrected by interpolation operation and/or extrapolation operation based on a motion vector at a feature point such as an edge, a corner, or the like of an image at which reliability is determines to be high. A motion vector of a macroblock partition generated by the parallel-translation motion compensation prediction unit 102 may be corrected for use. In the case of correcting a motion vector of a macroblock or a macroblock partition and using the motion vector, the value of the motion vector is corrected by applying the value of the motion vector to a representative pixel that is concerned and then examining the value of the motion vector while adjusting the value upward or downward.

Then, the geometric-transformation motion compensation prediction unit 103 calculates respective motion vectors of all pixels in the macroblock from the motion vector of the representative pixel by interpolation using linear interpolation or the like.

In the second mode for coding and/or decoding respective motion vectors of two representative pixels in the vertical direction (the first representative pixel a and the third representative pixel c), the geometric-transformation motion compensation prediction unit 103 calculates, from motion vectors of the two representative pixels a and c in the vertical direction, motion vectors of pixels on a straight line connecting these two points by interpolating the motion vectors. Motion vectors of other pixels are directly applied while keeping the motion vectors of the pixels, which have been linear interpolated, in the horizontal direction.

In the third mode for coding and/or decoding respective motion vectors of two representative pixels in the horizontal direction (the first representative pixel a and the second representative pixel b), the geometric-transformation motion compensation prediction unit 103 calculates, based on motion vectors of the two representative pixels a and b in the horizontal direction, motion vectors of pixels on a straight line connecting these two points by interpolating the motion vectors. Motion vectors of other pixels are directly applied while keeping the motion vectors of the pixels, which have been linear interpolated, in the vertical direction.

In the first mode for coding and/or decoding the respective motion vectors of the four representative pixels a, b, c, and d corresponding to four vertices a, b, c, and d, respectively or in the fourth mode for coding and/or decoding the respective motion vectors of the three representative pixels a, b, and c corresponding to the vertices a, b, and c, respectively, the geometric-transformation motion compensation prediction unit 103 calculates motion vectors of non-representative pixels by performing interpolation both in the horizontal direction and in the vertical direction. Interpolation may be performed both in the horizontal direction and in the vertical direction at a time by a method described later. Alternatively, the motion vectors of the non-representative pixels may be calculated from the motion vectors of two concerned representative pixels arranged in the horizontal direction by interpolating motion vectors of pixels on a straight line connecting these two points, and motion vectors of other pixels may be then calculated using already-calculated motion vectors of respective pixels by further performing interpolation in the vertical direction.

In the fourth mode for coding and/or decoding the respective motion vectors of the three representative pixels a, b, and c corresponding to the three vertices a, b, and c, respectively, the motion vector of the fourth representative pixel d can be calculated from the motion vectors of the first representative pixel a, the second representative pixel b, and the third representative pixel c. Just like the first mode for coding and/or decoding the respective motion vectors of the four representative pixels corresponding to the four vertices a, b, c, and d, the motion vectors of the non-representative pixels can be calculated.

In the second mode for coding and/or decoding the respective motion vectors of the two representative pixels a and c respectively corresponding to the two vertices a and c in the vertical direction, the value of the motion vector of the first representative pixel a is set to the value of the motion vector of the second representative pixel b, and the value of the motion vector of the third representative pixel c is set to the value of the motion vector of the fourth representative pixel d. Just like the first mode for coding and/or decoding the respective motion vectors of the four representative pixels a, b, c, and d respectively corresponding to the four vertices a, b, c, and d, the motion vectors of the non-representative pixels can be calculated.

In the third mode for coding and/or decoding the respective motion vectors of the two representative pixels a and b respectively corresponding to the two vertices a and b in the horizontal direction, the value of the motion vector of the first representative pixel a is set to the value of the motion vector of the third representative pixel c, and the value of the motion vector of the second representative pixel b is set to the value of the motion vector of the fourth representative pixel d. Just like the first mode for coding and/or decoding the respective motion vectors of the four representative pixels a, b, c, and d respectively corresponding to the four vertices a, b, c, and d, the motion vectors of the non-representative pixels can be calculated.

The geometric-transformation motion compensation prediction unit 103 performs motion compensation for each pixel using a calculated motion vector of each pixel. In the above explanation, an example is explained where the motion vector of each pixel included in a macroblock is calculated. The motion vector of each pixel included in a sub-microblock can be similarly calculated.

This process of calculating a motion vector in units of pixels and a process of motion compensating each pixel are performed in a plurality of defined modes. A reference index, the size of a motion prediction block, L0/L1/bi-predictive prediction, and the like are different in each of the plurality of modes. The L0/L1/bi-predictive prediction is selectable only in a B-slice.

The geometric-transformation motion compensation prediction unit 103 performs motion compensation in each mode and provides prediction information, a motion vector, and a prediction signal (more specifically, a motion compensation prediction block signal) in each mode to the prediction method determination unit 104.

An explanation is given with specific examples in the following regarding a method for calculating the motion vector of each pixel other than representative pixels in geometric-transformation motion compensation prediction.

The motion vectors of non-representative pixels are calculated by applying interpolation such as linear interpolation to the values of the respective motion vectors of the four representative pixels a, b, c, and d for each component both in the horizontal direction and in the vertical direction. In the above example in FIG. 3, the representative pixels are set to be the pixel a (0,0), the pixel b (W,0), the pixel c (0,H), and the pixel d (W,H) located at the vertices of the macroblock. In the example, the coordinates of each pixel are shown by (i,j) where the coordinate in the horizontal direction is shown by i in units of one pixel and the coordinate in the vertical direction is shown by j in units of one pixel. The uppermost left pixel in the macroblock is set to be the original point (0,0), and the rightward direction and the leftward direction are set to be directions of a positive increase.

First, the respective motion vectors of these pixels a, b, c, and d are assigned. The motion vectors of other pixels are then calculated by linear interpolation.

In the first mode for coding and/or decoding the respective motion vectors of the four representative pixels a, b, c, and d respectively corresponding to the four vertices a, b, c, and d, the motion vectors of these pixels a, b, c, and d are assigned. In the second mode for coding and/or decoding the respective motion vectors of the two representative pixels a and c respectively corresponding to the two vertices a and c, the motion vectors of these pixels a and c are assigned. The motion vector of the pixel a is the motion vector of the pixel b, and the motion vector of the pixel c is the motion vector of the pixel d. In the third mode for coding and/or decoding the respective motion vectors of the two representative pixels a and b respectively corresponding to the two vertices a and b, the motion vectors of these pixels a and b are assigned. The motion vector of the pixel a is the motion vector of the pixel c, and the motion vector of the pixel b is the motion vector of the pixel d.

In the fourth mode for coding and/or decoding the respective motion vectors of the three representative pixels a, b, and c respectively corresponding to the three vertices a, b, and c, the motion vectors of these pixels a, b, and c are assigned. The motion vector of the forth representative pixel d corresponding to the vertex d is calculated from the three motion vectors of these three points. Based on a relationship among a motion vector Va=V(0,0) of the pixel a, a motion vector Vb=V(W,0) of the pixel b, a motion vector Vc=V(0,H) of the pixel c, and a motion vector Vd=V(W,H) of the pixel d, the motion vector Vd of the representative pixel d corresponding to the vertex d is calculated by the following expression (1).

$$Vd=Vc+(Vb-Va) \quad \text{Expression (1)}$$

Alternatively, the motion vector is calculated by the following expression (2).

$$Vd=Vb+(Vc-Va) \quad \text{Expression (2)}$$

Then, based on the respective four motion vectors Va, Vb, Vc, and Vd of the four representative pixels a, b, c, and d, a motion vector V(i,j) of another pixel P(i,j) is generated by linear interpolation. When a distance (the number of pixels) between representative pixels in the horizontal direction (between the pixel a and the pixel b and between the pixel c and the pixel d) is set to be W and a distance (the number of pixels) between representative pixels in the vertical direction (between the pixel a and the pixel c and between the pixel b and the pixel d) is set to be H, the motion vector V(i,j) of a pixel P(i,j) other than these representative pixels a, b, c, and d is calculated by the following expression (3).

$$V(i,j)=[(W-i)(H-j)Va+i(H-j)Vb+(W-i)j*Vc+i*j*Vd]/(W*H) \quad \text{Expression (3)}$$

In the setting of the representative pixels shown in FIG. 3, W is 15 (pixels), and H is 15 (pixels).

As stated above, the motion vector of each pixel can be calculated in the first mode, the second mode, the third mode, and the fourth mode. An explanation has been given regarding a method for performing interpolation in both the horizontal direction and the vertical direction at a time (i.e., in two dimensions). Alternatively, the motion vector of a non-representative pixel may be calculated from the motion vectors of two representative pixels arranged in the horizontal direction by interpolating motion vectors of pixels on a straight line connecting these two points, and the motion vector of another pixel may be then calculated using already-calculated motion vectors of respective pixels by further performing interpolation in the vertical direction.

An explanation is given regarding a method for calculation in this case. On the condition that a motion vector Va of the pixel a is V(0,0), that a motion vector Vb of the pixel b is V(W,0), that a motion vector Vc of the pixel c is V(0,H), and that a motion vector Vd of the pixel d is V(W,H), the motion vector V(i,0) of each pixel P(i,0) on a line passing the pixel a and the pixel b is calculated by the following expression (4).

$$V(i,0)=Va+(Vb-Va)*(i-0)/W \qquad \text{Expression (4)}$$

Similarly, the motion vector V(i,H) of each pixel P(i,H) on a line passing the pixel c and the pixel d is calculated by the following expression (5).

$$V(i,H)=Vc+(Vd-Vc)*(i-0)/W \qquad \text{Expression (5)}$$

Further, the motion vector V(i,j) of a remaining pixel P(i,j) is calculated by the following expression (6).

$$V(i,j)=V(i,0)+[V(i,H)-V(i,0)]*(j-0)/H \qquad \text{Expression (6)}$$

As stated above, the motion vector of each pixel can be calculated in the first mode, the second mode, the third mode, and the fourth mode. Calculation can be also carried out by the following method in the second mode and the third mode.

In the second mode, the respective motion vectors of the pixels a and c are assigned. The motion vector of each pixel on a vertical line passing the pixel a and the pixel c is calculated by linear interpolation, and the same motion vector value is assigned to each pixel in the horizontal direction.

On the condition that the motion vector Va of the pixel a is V(0,0) and that the motion vector Vc of the pixel c is V(0,H), the motion vector V(0,j) of each pixel on a line passing the pixel a and the pixel c is calculated by the following expression (7).

$$V(0,j)=Va+(Vc-Va)*(j-0)/H \qquad \text{Expression (7)}$$

Then, as shown in the following expression (8), the value of the motion vector V(0,j) calculated by the expression (7) is extended in the horizontal direction, and the value of the motion vector V(0,j) is assigned to the motion vector V(i,j) of a remaining pixel.

$$V(i,j)=V(0,j) \qquad \text{Expression (8)}$$

The motion vector V(i,j) of a remaining pixel may be calculated by the following expression (9).

$$V(i,j)=Va+(Vc-Va)*(j-0)/H \qquad \text{Expression (9)}$$

In the third mode, the respective motion vectors of the pixels a and b are assigned. The motion vector of each pixel on a vertical line passing the pixel a and the pixel b is calculated by linear interpolation, and the same motion vector value is assigned to each pixel in the horizontal direction.

On the condition that the motion vector Va of the pixel a is V(0,0) and that the motion vector Vb of the pixel b is V(W,0), the motion vector V(i,0) of each pixel on a line passing the pixel a and the pixel b is calculated by the following expression (10).

$$V(i,0)=Va+(Vb-Va)*(i-0)/W \qquad \text{Expression (10)}$$

Then, as shown in the following expression (11), the value of the motion vector V(i,0) calculated by the expression (10) is extended in the vertical direction, and the value of the motion vector V(i,0) is assigned to the motion vector V(i,j) of a remaining pixel.

$$V(i,j)=V(i,0) \qquad \text{Expression (11)}$$

The motion vector V(i,j) of a remaining pixel may be calculated by the following expression (12).

$$V(i,j)=Va+(Vb-Va)*(i-0)/W \qquad \text{Expression (12)}$$

The geometric-transformation motion compensation prediction unit 103 performs motion compensation prediction of each pixel according to a calculated motion vector of each pixel. More specifically, the geometric-transformation motion compensation prediction unit 103 performs motion compensation prediction by generating an interpolation signal from a pixel of a reference image indicated by the motion vector of each pixel. The accuracy of the motion vector of each pixel, a way of rounding numerical values that is necessary during a process of computation, and the like need to be defined such that the same value is obtained when decoding is performed in any decoding apparatus. If the coordinates of a prediction pixel specified by a motion vector are expressed as numbers with digits after the decimal point, the pixel is interpolated from surrounding pixels at the time of motion compensation. As a method for the interpolation, 4-tap to 6-tap filtering, linear interpolation, and the like can be used.

In the first mode, complicated transformation such as enlargement, reduction, rotation, and parallel translation, which cannot be expressed in the second through fourth modes, can be expressed using four motion vectors. In the fourth mode, transformation by an affine transformation can be expressed using three motion vectors. Although the transformation expressiveness is limited in comparison to that in the first mode, the number of motion vectors (more specifically, difference vectors) to be coded can be reduced.

In the second mode, in addition to parallel translation, transformation different in the vertical direction can be expressed using two motion vectors. Although the transformation expressiveness is limited in comparison to that in the first mode and to that in the fourth mode, the number of motion vectors to be coded can be reduced. In the third mode, in addition to parallel translation, transformation different in the horizontal direction can be expressed using two motion vectors. Although the transformation expressiveness is limited in comparison to that in the first mode and to that in the fourth mode, the number of motion vectors to be coded can be reduced.

Referring back to FIG. 1, the prediction method determination unit 104 determines which one of a prediction method by the parallel-translation motion compensation prediction unit 102 or a prediction method by the geometric-transformation motion compensation prediction unit 103 is to be employed for each target block in a target image. More specifically, the prediction method determination unit 104 determines a prediction method and a mode of the prediction method to be employed. This determination process including the selection of a mode is hereinafter referred to as the selection of a prediction method.

In other words, the prediction method determination unit 104 determines a prediction method by selecting either motion compensation prediction by parallel translation or motion compensation prediction by geometric transformation, a reference image to be used, and a pixel block unit for performing coding. When selecting the motion compensation prediction by geometric transformation, the prediction method determination unit 104 selects any one of the first through fourth modes. The prediction method determination unit 104 determines a prediction method by determining a combination of these items that allows the most efficient coding to be realized at that time. As a standard for determining a prediction method, e.g., the rate-distortion theory in which the amount of coding and distortion are taken into consideration can be used. More specifically, in addition to calculating the amount of coding of a macroblock (i.e., prediction method information, the total amount of coding of motion vectors and prediction signals), the prediction method determination unit 104 calculates the amount of distortion based on a difference between a coding target image and a decoded image and selects a prediction method that minimizes a rate-distortion function where the amount of the coding and the amount of the distortion are used as input variables.

The prediction method determination unit 104 provides the employed prediction method information to the first coding bit string generation unit 107 and a difference vector calculation unit 114 and provides a motion vector according to the employed prediction method to the difference vector calculation unit 114. At the same time, the prediction method determination unit 104 provides a prediction signal generated by the employed prediction method to the prediction error signal generation unit 105.

The first coding bit string generation unit 107 codes the prediction method information provided from the prediction method determination unit 104 by entropy coding such as arithmetic coding so as to generate a coding bit string. A prediction block size, the distinction among L0 prediction, L1 prediction, and bi-predictive prediction, and the like to be included in the prediction method information are coded in combination as a macroblock type. With regard to information to be included in the prediction method information that is used for determining which one of the motion compensation prediction by parallel translation and the motion compensation prediction by geometric transformation is to be used and which one of the first through fourth modes is to be used when the motion compensation prediction by geometric transformation is used, the following description method can be used. For example, syntax elements may be separately prepared so as to make description. Alternatively, the macroblock type may be expanded by combining the information with information to be coded as another macroblock type so as to conduct description.

For example, a syntax element "geom_type" is prepared for each unit of blocks for which whether or not to perform the motion compensation prediction by geometric transformation is switched. Coding is then performed on the condition that the value "0" of "geom_type" represents the motion compensation prediction by parallel translation, that the value "1" of "geom_type" represents the first mode for the motion compensation prediction by geometric transformation, that the value "2" of "geom_type" represents the second mode for the motion compensation prediction by geometric transformation, that the value "3" of "geom_type" represents the third mode for the motion compensation prediction by geometric transformation, and that the value "4" of "geom_type" represents the fourth mode for the motion compensation prediction by geometric transformation.

FIG. 4 is a diagram illustrating an example of a syntax structure. In FIG. 4, an example is shown where one "geom_type" is prepared for each macroblock so as to perform motion compensation prediction in a mode common to L0 prediction, L1 prediction, and bi-predictive prediction. Alternatively, in a bi-predictive mode where prediction is performed based on both L0 and L1, different motion compensation prediction can be performed in L0 prediction and L1 prediction by preparing two items of "geom_type".

When coding a motion vector of a target block, a prediction vector is calculated by using correlation with the motion vector of a surrounding adjacent block or a pixel of the adjacent block that has been already coded or decoded and then by predicting a motion vector from the motion vector of the adjacent block or the pixel of the adjacent block. By calculating a difference vector, which is a difference between the prediction vector and a motion vector of the target block or the target pixel, the amount of coding of the motion vector of the target block or the target pixel is reduced. In a target block for which the motion compensation prediction by geometric transformation is employed, the motion vector of a representative pixel thereof is a coding target.

In accordance with the prediction method information provided by the prediction method determination unit 104, the difference vector calculation unit 114 calculates a prediction vector by predicting the motion vector of the target block or the target pixel from the motion vector of the surrounding adjacent block or a pixel of the adjacent block that has been already coded. The difference vector calculation unit 114 generates a difference vector by calculating a difference between the prediction vector and a motion vector provided by the prediction method determination unit 104 and provides the difference vector to the second coding bit string generation unit 108.

In the first mode, in order to code and/or decode the respective motion vectors of the four representative pixels a, b, c, and d respectively corresponding to the four vertices a, b, c, and d, the difference vector calculation unit 114 calculates respective prediction vectors and difference vectors. In the second mode, in order to code and/or decode the respective motion vectors of the two representative pixels a and c respectively corresponding to the two vertices a and c, the difference vector calculation unit 114 calculates respective prediction vectors and difference vectors. In the third mode, in order to code and/or decode the respective motion vectors of the two representative pixels a and b respectively corresponding to the two vertices a and b, the difference vector calculation unit 114 calculates respective prediction vectors and difference vectors. In the fourth mode, in order to code and/or decode the respective motion vectors of the three representative pixels a, b, and c respectively corresponding to the three vertices a, b, and c, the difference vector calculation unit 114 calculates respective prediction vectors and difference vectors.

The difference vector calculation unit 114 stores prediction information and the motion vector of the target block provided from the prediction method determination unit 104 and uses the prediction information and the motion vector to calculate a prediction vector of a subsequent target block.

Figure 5A:
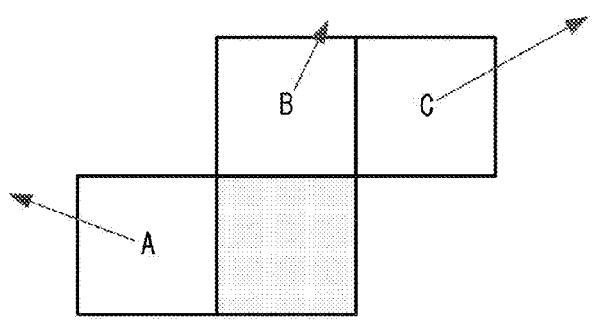
FIGS. 5A-5D are diagrams explaining a method for predicting a motion vector when motion compensation prediction by parallel translation is selected for both a target block and an adjacent block.
Figure 5B:
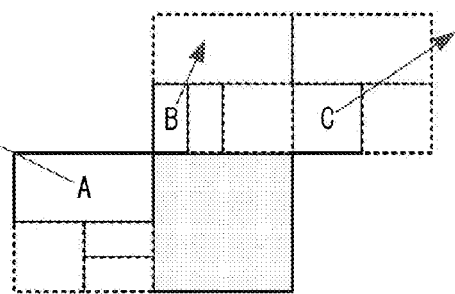
Figure 5C:
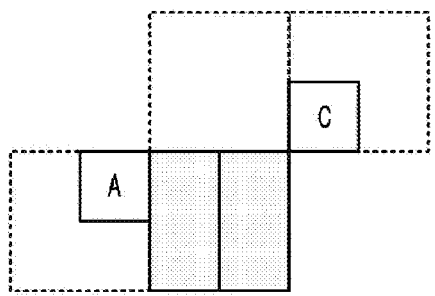
Figure 5D:
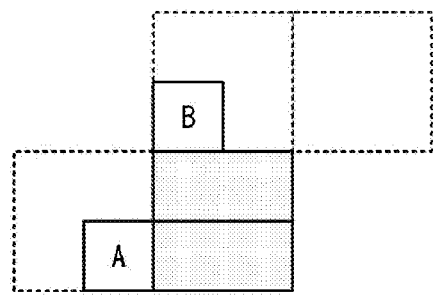

An explanation is now given regarding a method for predicting a motion vector of a coding target block when motion compensation prediction by parallel translation is selected for both the coding target block and an adjacent block thereof. FIGS. 5A-5D are diagrams explaining a method for predicting a motion vector of a coding target block when motion compensation prediction by parallel translation is selected for both the target block and an adjacent block thereof. FIG. 5A illustrates an example of predicting a motion vector among macroblocks for which a partition is not set. FIG. 5B illustrates an example of predicting a motion vector among macroblocks for which partitions are set. FIG. 5C illustrates an example of predicting a motion vector among macroblocks of 8×16 pixels. FIG. 5D illustrates an example of predicting a motion vector among macroblocks of 16×8 pixels. An explanation regarding a method for predicting a motion vector is given in the following in reference to FIGS. 5A through 5D. In this method for predicting a motion vector, the motion vector of a target block is predicted using a median value of motion vectors of surrounding adjacent blocks.

In FIGS. 5A through 5D, the motion vector of a block colored in gray is a coding target. In FIG. 5A, the motion vector of a target block is predicted using three respective motion vectors of a block A adjacent to the left of the target block, a block B adjacent to the top of the target block, and a block C adjacent to the upper right of the target block as candidate motion vectors. More specifically, a median value is obtained for a horizontal component and for a vertical component from these three motion vectors and used for a prediction vector. In a B picture, an L0 motion vector used for L0 prediction or bi-predictive prediction and an L1 motion vector used for L1 prediction or bi-predictive prediction are treated separately. By performing prediction using three respective L0 motion vectors of the block A adjacent to the left of the target block, the block B adjacent to the top of the target block, and the block C adjacent to the upper right of the target block, an L0 prediction vector of the target block is calculated. Similarly, by performing prediction using three respective L1 motion vectors of the block A adjacent to the left of the target block, the block B adjacent to the top of the target block, and the block C adjacent to the upper right of the target block, an L1 prediction vector of the target block is calculated. If the top-adjacent block B and the upper-right adjacent block C cannot be used and only the block A can be used, the motion vector of the block A is employed as the prediction vector. If only one of respective reference indices of the left-adjacent block A, the top-adjacent block B, and the upper-right adjacent block C has the same value (the same reference picture) as that of a reference index of the coding target block, the motion vector of the block is used for prediction.

As shown in FIG. 5B, when partitions are set for adjacent macroblocks, a motion vector varies for each small block of a macroblock. In that case, the motion vector of a small block A, which is the topmost small block among small blocks in contact with a target block in a block adjacent to the left of the target block, is employed as a candidate motion vector. In a top-adjacent block, a small block B, which is the leftmost small block among small blocks in contact with the target block, is employed as a candidate. In an upper-right adjacent block, a small block C located at the extreme lower left is employed. In accordance with this rule, a prediction vector is calculated as in the case of FIG. 5A.

As shown in FIG. 5C, when a block to be coded is 8×16 pixels, a left block and a right block employ, instead of a median value of the respective motion vectors of three blocks, the motion vector of a block A adjacent to the left of the left block and the motion vector of a block C adjacent to the upper right of the right block, respectively, as respective prediction vectors. As shown in FIG. 5D co, when a block to be coded is 16×8 pixels, an upper block and a lower block employ, instead of a median value of the respective motion vectors of three blocks, the motion vector of a block B adjacent to the top of the upper block and the motion vector of a block A adjacent to the left of the lower block, respectively, as respective prediction vectors.

A method for predicting a motion vector shown in each of FIGS. 5A through 5D is an example and is not limited to the example. Insofar as a method for predicting a motion vector is defined to be identical in the coding side and the decoding side, another method can also be used. For example, the position and the number of adjacent blocks may be different. An average value instead of a median value of a plurality of motion vectors of adjacent blocks may be used. A prescribed condition and the order of priority may be set, and the motion vector of a single adjacent block may be directly used. An adjacent block does not necessarily need to be in contact with a target block. In FIGS. 5A through 5D, an example is explained where a motion vector is predicted in units of macroblocks. In the case of predicting a motion vector in units of sub-macroblocks, the same process can be performed.

Figure 6:
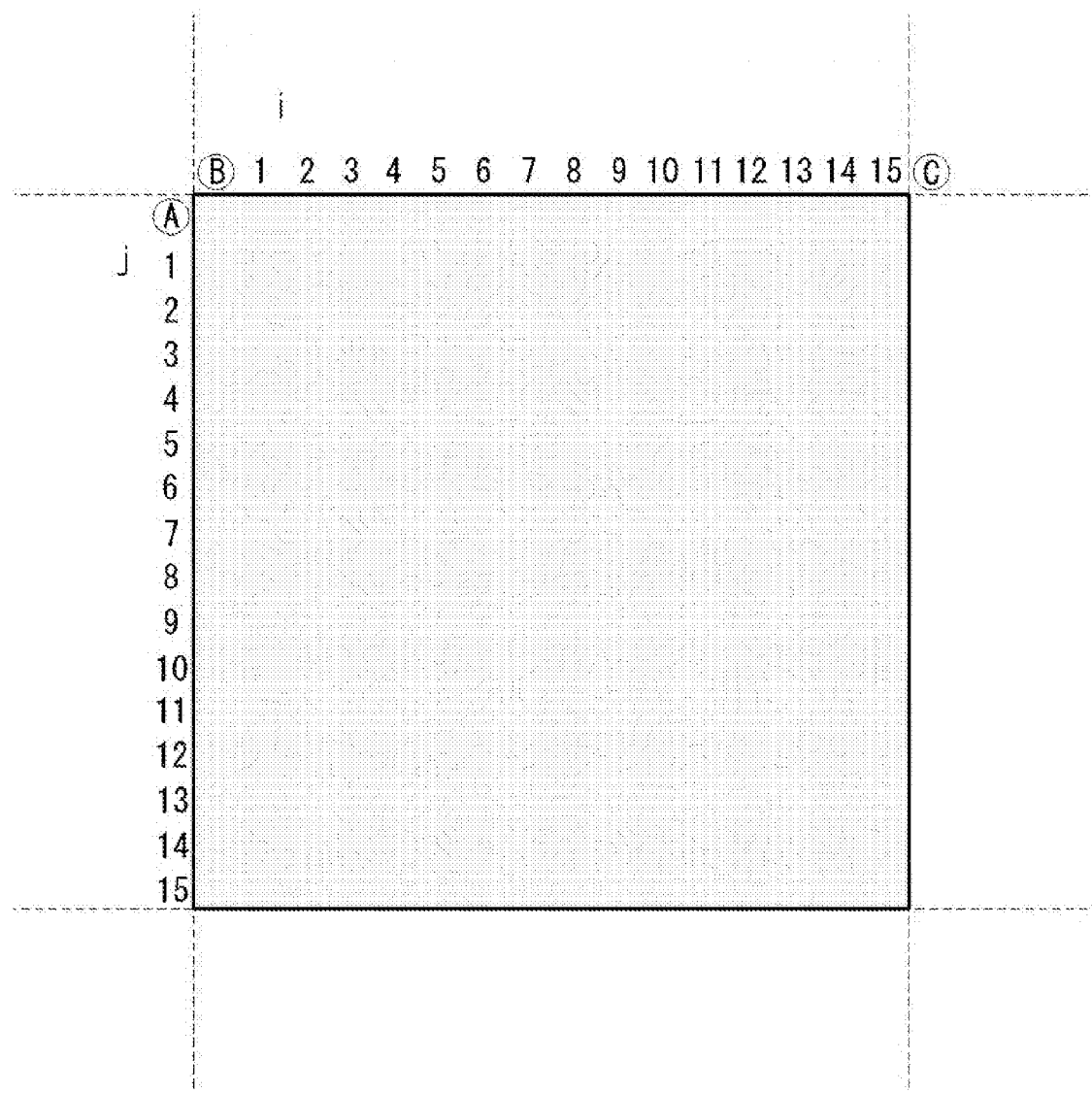
FIG. 6 is a diagram explaining a method for predicting a prediction vector when a coding target block is subject to motion compensation prediction by parallel translation and an adjacent block is subject to motion compensation prediction by geometric transformation.

An explanation is now given regarding a method for predicting a motion vector of a coding target block when motion compensation prediction by parallel translation is selected for a coding target block and motion compensation prediction by geometric transformation is selected for an adjacent block. FIG. 6 is a diagram for explaining a method for predicting a prediction vector when a coding target block is subject to motion compensation prediction by parallel translation and an adjacent block is subject to motion compensation prediction by geometric transformation. As shown in FIG. 6, when an adjacent block is subject to the motion compensation prediction by geometric transformation, the motion vector of a pixel A, which is located at the uppermost right of the uppermost small block among small blocks in contact with a target block in a block adjacent to the left of the target block, is employed as a candidate motion vector used for the calculation of a prediction vector. In a top-adjacent block, the motion vector of a pixel B, which is located at the lowermost left of the leftmost block among small blocks in contact with the target block, is employed as a candidate motion vector used for the calculation of a prediction vector. In an upper-right adjacent block, the motion vector of a pixel C, which is located at the lowermost left of the leftmost block, is employed as a candidate motion vector used for the calculation of a prediction vector.

A method for predicting a motion vector shown in FIG. 6 is merely an example, and a method for predicting a motion vector is not limited to the example. Insofar as a method for predicting a motion vector is defined to be identical in the coding side and the decoding side, another method can also be used. For example, an average value of the respective motion vectors of four representative pixels of a block adjacent to the left of a target block may be used as a candidate motion vector of the block adjacent to the left of the target block. An average value of the respective motion vectors of four representative pixels of a block adjacent to the top of the target block may be used as a candidate motion vector of the block adjacent to the top of the target block. An average value of the respective motion vectors of four representative pixels of a block adjacent to the upper right of the target block may be used as a candidate motion vector of the block adjacent to the upper right of the target block. Further, the position and the number of adjacent blocks and pixels of the adjacent blocks may be different. An average value instead of a median value of a plurality of motion vectors of the pixels of adjacent blocks may be used. The motion vector of a single pixel of an adjacent block may be directly used. An adjacent block or a pixel of an adjacent block does not necessarily need to be in contact with a target block. In FIG. 6, an example is explained where a motion vector is predicted in units of macroblocks. In the case of predicting a motion vector in units of sub-macroblocks, the same process can be performed.

Figure 7B:
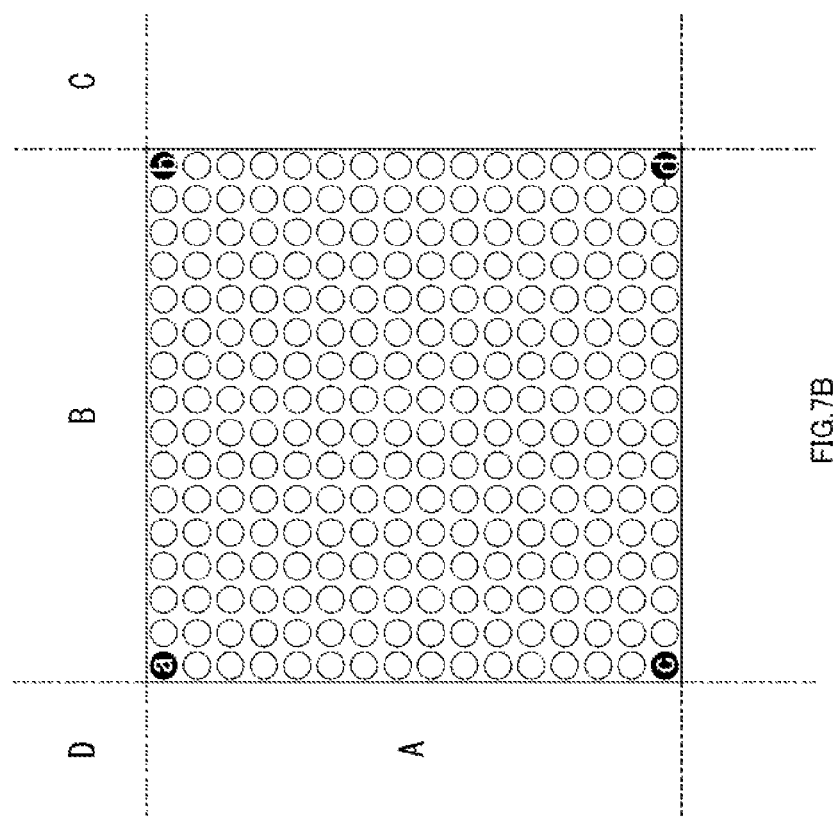
FIGS. 7A and 7B are diagrams explaining a prediction vector prediction method when a target block is subject to motion compensation prediction by geometric transformation.
Figure 7A:
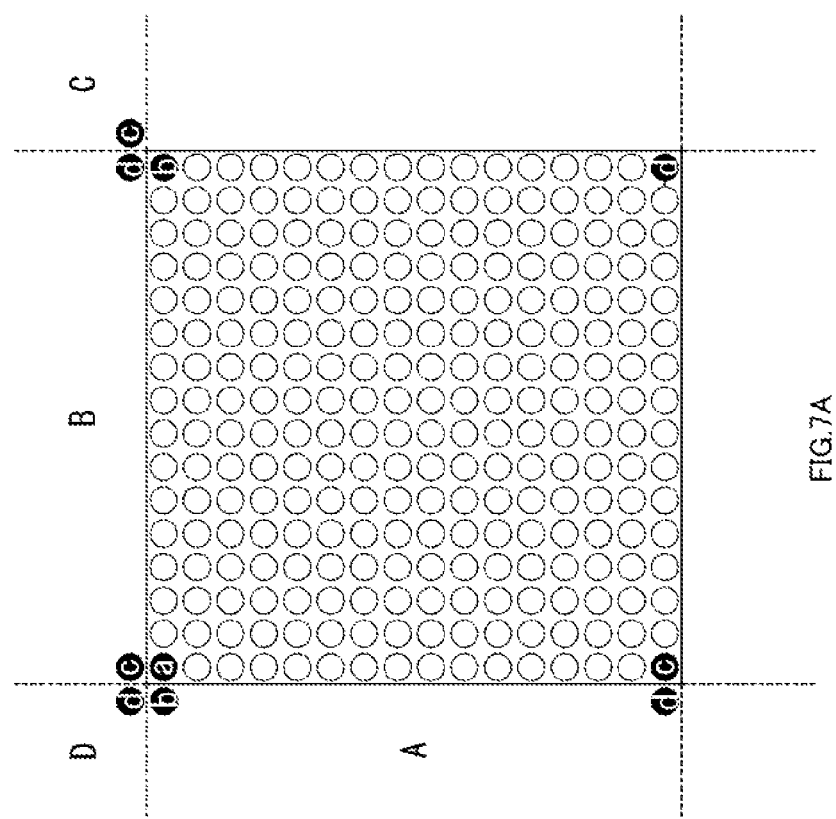

Then, an explanation is given regarding a method for predicting a motion vector of a coding target block when motion compensation prediction by geometric transformation is selected for both the coding target block and an adjacent block thereof. FIG. 7 is a diagram for explaining a prediction vector prediction method when a coding target block is subject to motion compensation prediction by geometric transformation. In this case, a prediction vector is also calculated from the motion vector of an adjacent block in a similar manner. Respective prediction vectors of a first representative pixel a, a second representative pixel b, and a third representative pixel c of a coding target block are predicted from the motion vector of an adjacent block. In FIG. 7A, a prediction vector of the first representative pixel a of the coding target block is calculated in reference to the motion vector of a representative pixel b of a left-adjacent block A, the motion vector of a representative pixel c of a top-adjacent block B, the motion vector of a representative pixel d of a upper-left adjacent block D. In this calculation method, when there are plurality of candidates, a predetermined order of priority is set to employ candidates in the order of priority, and a median value or an average value of these motion vectors is calculated. A prediction vector of the second representative pixel b of the coding target block is calculated in reference to the motion vector of a representative pixel d of a top-adjacent block B and the motion vector of a representative pixel c of an upper-right adjacent block C. When a median value is used for the prediction vector, the motion vector of the first representative pixel a of the coding target block is also used as a candidate, and a median value is calculated based on these three motion vectors. As a prediction vector of the third representative pixel c of the coding target block, the motion vector of a representative pixel c of a left-adjacent block A is employed.

An explanation is now given regarding a method for predicting a motion vector of a coding target block when motion compensation prediction by geometric transformation is selected for a coding target block and motion compensation prediction by parallel translation is selected for an adjacent block. As shown in FIG. 7B, when an adjacent block is subject to motion compensation prediction by parallel translation, all the pixels in the adjacent block share common motion vector of an adjacent block. Thus, calculation is performed using a method similar to the method for predicting a motion vector of a coding target block when motion compensation prediction by geometric transformation is selected for both the coding target block and an adjacent block thereof. The motion vector of the block that is concerned is calculated as the motion vector of a representative pixel of an adjacent block.

A method for predicting a motion vector when motion compensation prediction by geometric transformation is selected, which is shown in FIG. 7, is merely an example, and a method for predicting a motion vector in that case is not limited to the example. Insofar as a method for predicting a motion vector is defined to be identical in the coding side and the decoding side, another method can also be used. For example, the position and the number of representative pixels of adjacent blocks may be different. An average value instead of a median value of a plurality of motion vectors of the representative pixels of adjacent blocks may be used. The motion vector of a single representative pixel of an adjacent block may be directly used. A representative pixel of an adjacent block does not necessarily need to be in contact with a target pixel.

Regarding a fourth representative pixel d to be coded and/or decoded in the first mode, a median value of the respective motion vectors of the first representative pixel a, the second representative pixel b, and the third representative pixel c is used as a prediction vector. Insofar as a method for predicting a motion vector is defined to be identical in the coding side and the decoding side, another method can also be used. For example, an average value instead of a median value may be used; alternatively, the motion vector of a single arbitrary pixel may be directly used.

A prediction vector PVd of the fourth representative pixel d to be coded and/or decoded in the first mode is calculated by the following expression (13) from respective motion vectors Va, Vb, and Vc of the first representative pixel a, the second representative pixel b, and the third representative pixel c.

$$PVd = Vc + (Vb - Va) \quad \text{Expression (13)}$$

Alternatively, the prediction vector be also calculated by the following expression (14).

$$PVd = Vb + (Vc - Va) \quad \text{Expression (14)}$$

The above expressions (13) and (14), which are the expressions for calculating the prediction vector of the fourth representative pixel d to be coded and/or decoded in the first mode, are the same as the above expressions (1) and (2), which are the expressions for calculating the fourth representative pixel d calculated in the fourth mode, respectively. In the first mode, transformation that cannot be expressed in the second mode, the third mode, and the fourth mode can be expressed, and the transformation is often similar to an affine transformation that can be expressed in the fourth mode. The prediction vector that can be calculated by the above expression (13) or (14) is based on the concept that prediction vector has strong correlation with the motion vector of the fourth representative pixel d to be coded and/or decoded in the first mode.

Insofar as a method for predicting a motion vector is defined to be identical in the coding side and the decoding side, another method can also be used. For example, regarding the fourth representative pixel d, a median value of the respective motion vectors of the first representative pixel a, the second representative pixel b, and the third representative pixel c can be used as the prediction vector. Alternatively, an average value instead of the median value may be used. The motion vector of a single arbitrary pixel may also be directly used. Alternatively, the prediction vector calculated by the expression (7), the motion vector of the first representative pixel a, the motion vector of the second representative pixel b, the motion vector of the third representative pixel c, the median value of the respective motion vectors of the first representative pixel a, the second representative pixel b, and the third representative pixel c, and the average value of the respective motion vectors of the first representative pixel a, the second representative pixel b, and the third representative pixel c may be used as candidates, and at least two candidates may be adaptively switched. In this case, a flag for specifying a motion vector to be employed as the prediction vector from the plurality of candidates is prepared in the syntax, and this flag is coded by the first coding bit string generation unit.

Referring back to FIG. 1, the second coding bit string generation unit 108 codes the difference vector provided from a difference vector calculation unit 114 by entropy coding such as arithmetic coding so as to generate a coding bit string.

In the motion compensation prediction by geometric transformation, two to four difference vectors are coded in accordance with the first through fourth modes. In the first mode, respective difference vectors of the four representative pixels a, b, c, and d respectively corresponding to the four vertices a, b, c, and d are coded. In the second mode, respective difference vectors of the representative pixels a and c respectively corresponding to the two vertices a and c are coded. In the third mode, respective difference vectors of the representative pixels a and b respectively corresponding to the two vertices a and b are coded. In the fourth mode, respective difference vectors of the three representative pixels a, b, and c respectively corresponding to the three vertices a, b, and c are coded.

The prediction error signal generation unit 105 calculates a difference between a prediction signal generated by a prediction method employed by the prediction method determination unit 104 and an image signal of a target block and generates a prediction error signal. More specifically, the prediction error signal generation unit 105 generates a prediction error signal by subtracting a prediction signal provided from the prediction method determination unit 104 from a coding target image signal provided from the image buffer 101 and provides the prediction error signal to the prediction error signal coding unit 106.

The prediction error signal coding unit 106 performs a compression encoding process such as orthogonal transformation, quantization, or the like on the prediction error signal provided from the prediction error signal generation unit 105 so as to generate a coded prediction error signal and provides the coded prediction error signal to the third coding bit string generation unit 109 and the prediction error signal decoding unit 110.

The third coding bit string generation unit 109 sequentially codes the coded prediction error signal provided from the prediction error signal coding unit 106 using entropy coding such as arithmetic coding so as to generate a coding bit string.

The respective coding bit strings generated by the first coding bit string generation unit 107, the second coding bit string generation unit 108, and the third coding bit string generation unit 109 are multiplexed via the output switch 113 along with another coding bit string, in which information other than the prediction method information, the motion vector, and the prediction error signal is coded, so as to generate a coded stream.

The prediction error signal decoding unit 110 performs a decompression/decoding process such as inverse quantization, inverse orthogonal transformation, or the like on the prediction error signal coded by the prediction error signal coding unit 106 so as to decode the prediction error signal. The prediction error signal decoding unit 110 provides the decoded prediction error signal to the decoded image signal generation unit 111. The decoded image signal generation unit 111 superimposes the prediction error signal provided from the prediction error signal coding unit 106 with the prediction signal provided from the prediction method determination unit 104 so as to generate a decoded image signal. The decoded image signal generation unit 111 sequentially stores the decoded image signal in the decoded image buffer 112 in units of blocks. The decoded image stored in the decoded image buffer 112 is used as a reference image, as necessary, when performing motion compensation prediction on a subsequent image in order of coding.

Figure 8:
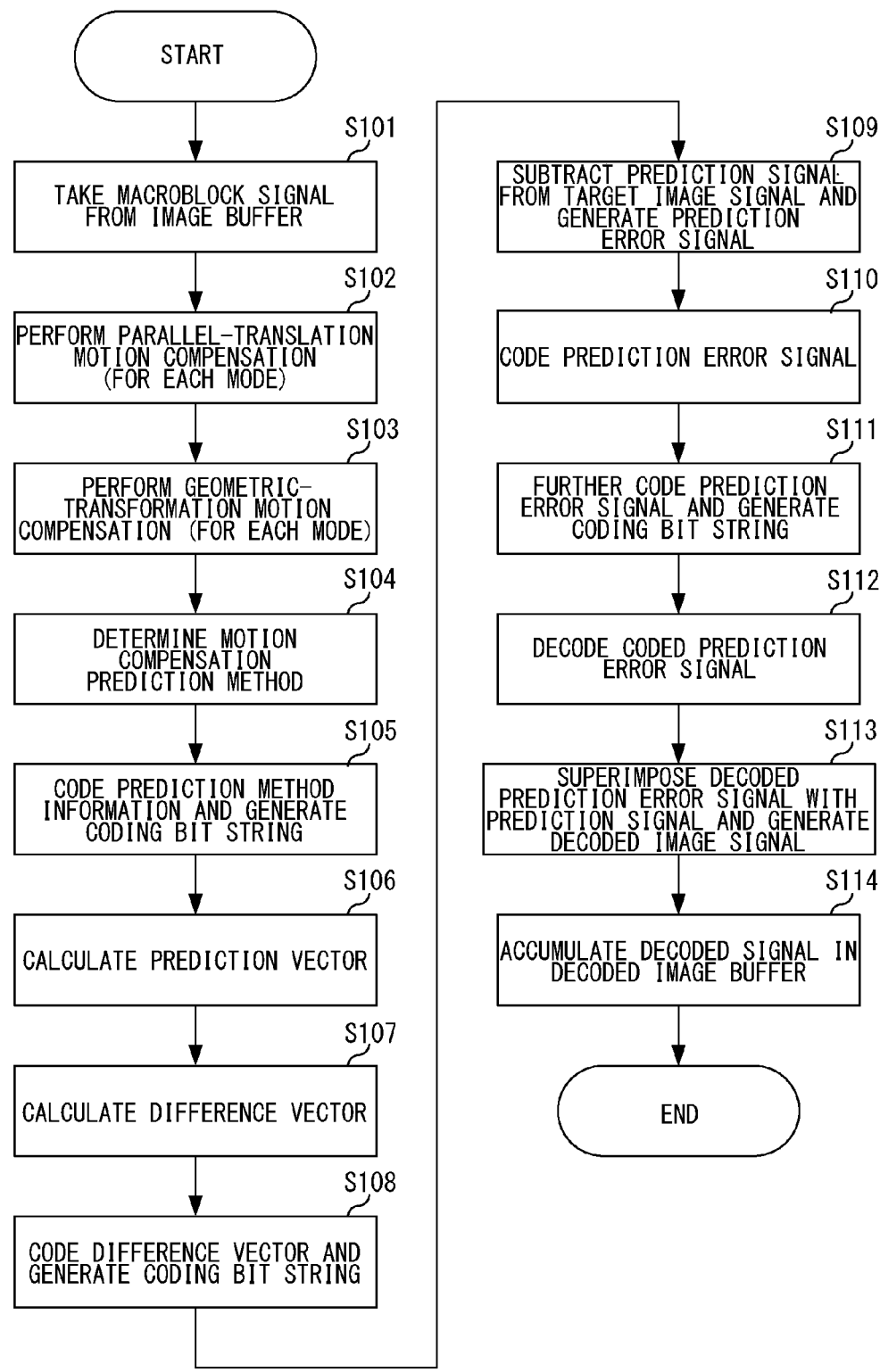
FIG. 8 is a flowchart illustrating the procedure of a macroblock coding process in the image coding apparatus according to the first embodiment of the present invention.

FIG. 8 is a flowchart illustrating the procedure of a macroblock coding process in the image coding apparatus 100 according to the first embodiment of the present invention. First, the parallel-translation motion compensation prediction unit 102 and the geometric-transformation motion compensation prediction unit 103 take a coding target macroblock signal from the image buffer 101 (S101).

The parallel-translation motion compensation prediction unit 102 performs motion compensation prediction by parallel translation between the coding target macroblock signal provided from the image buffer 101 and a reference image signal provided from the decoded image buffer 112 (S102). The parallel-translation motion compensation prediction unit 102 performs the motion compensation prediction by parallel translation on a mode-by-mode basis. The geometric-transformation motion compensation prediction unit 103 performs motion compensation prediction by geometric transformation between the coding target macroblock signal provided from the image buffer 101 and the reference image signal provided from the decoded image buffer 112 (S103). The geometric-transformation motion compensation prediction unit 103 performs the motion compensation prediction by geometric transformation on a mode-by-mode basis.

The prediction method determination unit 104 determines whether to employ a motion compensation prediction method by parallel translation or a motion compensation prediction method by geometric transformation (S104). The prediction method determination unit 104 also determines which mode is to be employed at that time.

The first coding bit string generation unit 107 codes the prediction method information provided from the prediction method determination unit 104 so as to generate a coding bit string (S105). The difference vector calculation unit 114 calculates a prediction vector from a surrounding block or a surrounding pixel (S106) and calculates a difference vector between the prediction vector and a motion vector provided from the prediction method determination unit 104 (S107).

The second coding bit string generation unit 108 codes the difference vector provided from the difference vector calculation unit 114 so as to generate a coding bit string (S108). The prediction error signal generation unit 105 subtracts a prediction signal provided from the prediction method determination unit 104 from a coding target image signal provided from the image buffer 101 so as to generate a prediction error signal (S109). The prediction error signal coding unit 106 codes the prediction error signal (S110). The third coding bit string generation unit 109 entropy codes the prediction error signal coded by the prediction error signal coding unit 106 using arithmetic coding or the like so as to generate a coding bit string (S111).

The prediction error signal decoding unit 110 decodes the prediction error signal coded by the prediction error signal coding unit 106 (S112). The decoded image signal generation unit 111 superimposes the prediction error signal decoded by the prediction error signal decoding unit 110 with the prediction signal provided from the prediction method determination unit 104 so as to generate a decoded image signal (S113). The decoded image signal generation unit 111 accumulates the generated decoded image signal in the decoded image buffer 112 (S114).

As explained above, the efficiency of coding amount compression can be improved by an image coding method in which motion compensation prediction by geometric transformation is used. In other words, by performing prediction coding on a motion vector for which the motion compensation prediction by geometric transformation is used, the amount of coding can be reduced. By using the motion compensation prediction by parallel translation together with the motion compensation prediction by geometric transformation, the efficiency of coding amount compression can be further improved. In that case, by communalizing a method of coding a motion vector according to the motion compensation prediction by parallel translation and a method of coding a motion vector according to the motion compensation prediction by geometric transformation, an existing motion vector prediction coding method can be directly diverted even when these two prediction methods are mixed.

In a block for which the motion compensation prediction by geometric transformation is employed, a prediction vector can be predicted from the motion vector of a surrounding block or a surrounding pixel, and a difference vector can be calculated, as in the case of the motion compensation prediction by parallel translation. With this, even when the motion compensation prediction by parallel translation is used together with the motion compensation prediction by geometric transformation, the amount of coding a motion vector can be prevented from being increased. Particularly, in the first mode of the motion compensation prediction by geometric transformation, the value of a difference vector can be reduced, and the amount of coding a motion vector can be prevented from being increased by calculating a prediction vector of the fourth representative pixel d by the above expression (13) or (14) from the respective motion vectors of the first representative pixel a, the second representative pixel b, and the third representative pixel c. In the fourth mode, the amount of coding a motion vector can be further prevented from being increased by calculating the motion vector of the fourth representative pixel d by the above expression (1) or (2) from the respective motion vectors of the first representative pixel a, the second representative pixel b, and the third representative pixel c.

Figure 9:
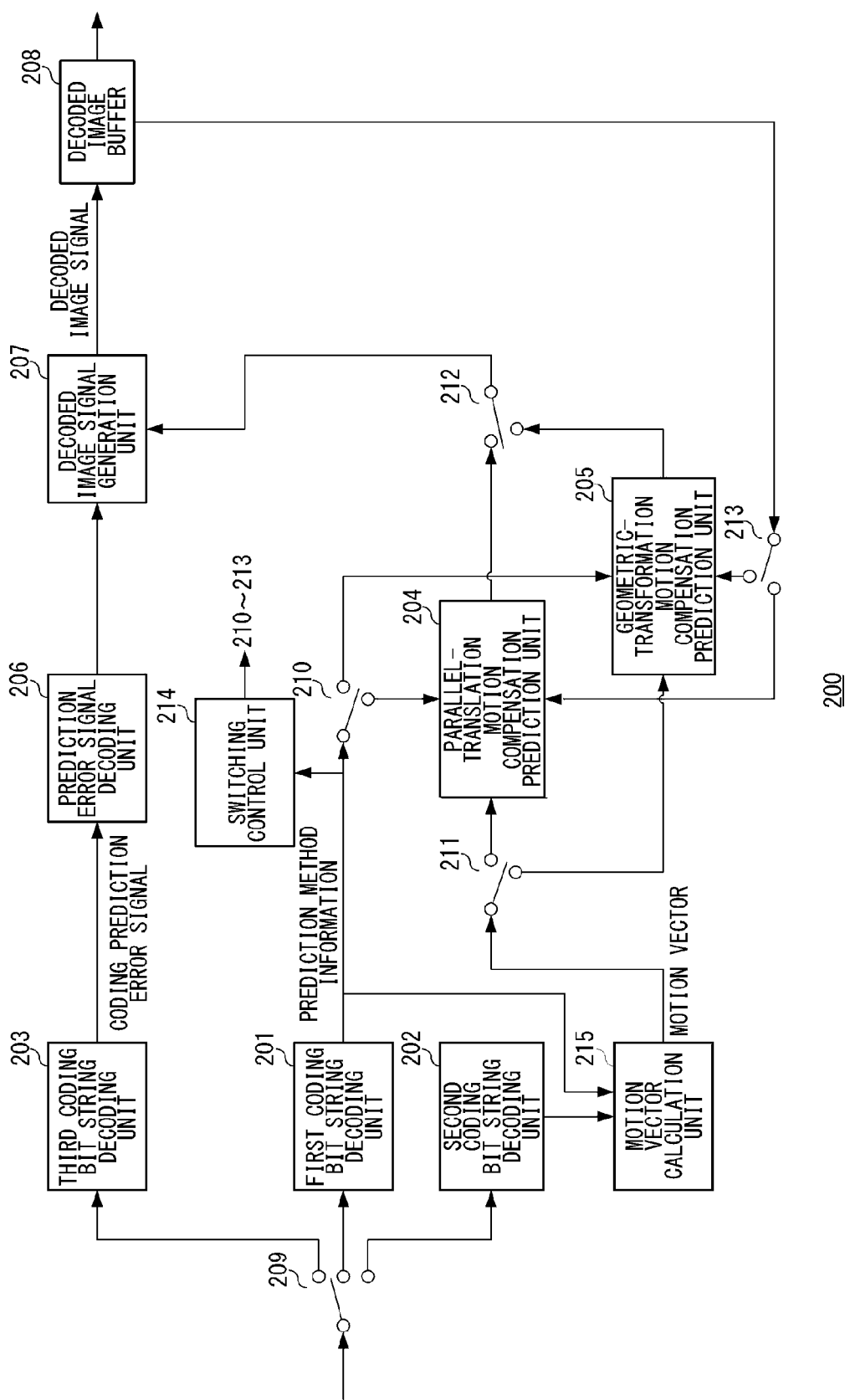
FIG. 9 is a block diagram illustrating the configuration of an image decoding apparatus according to a second embodiment of the present invention.

FIG. 9 is a block diagram illustrating the configuration of an image decoding apparatus 200 according to a second embodiment of the present invention. The image decoding apparatus 200 decodes a coded stream generated by the image coding apparatus 100 according to the first embodiment. In the coded stream, there is a case where the motion compensation prediction by parallel translation and the motion compensation prediction by geometric transformation are used together and a case where the motion compensation prediction by geometric transformation is independently used, as described above (intra coding is not taken into consideration).

The image decoding apparatus 200 is provided with an input switch 209, a first coding bit string decoding unit 201, a second coding bit string decoding unit 202, a third coding bit string decoding unit 203, a motion vector calculation unit 215, a parallel-translation motion compensation prediction unit 204, a geometric-transformation motion compensation prediction unit 205, a prediction error signal decoding unit 206, a decoded image signal generation unit 207, a decoded image buffer 208, a switching control unit 214, a first prediction unit switch 210, a second prediction unit switch 211, a third prediction unit switch 212, and a fourth prediction unit switch 213.

The configuration thereof is implemented by hardware such as a processor, a memory, or other LSIs and by software such as a program or the like loaded into the memory. The figure depicts functional blocks implemented by the cooperation of hardware and software. Thus, a person skilled in the art should appreciate that there are many ways of accomplishing these functional blocks in various forms in accordance with the components of hardware only, software only, or the combination of both.

The first coding bit string decoding unit 201, the second coding bit string decoding unit 202, and the third coding bit string decoding unit 203 decode prediction method information, a difference vector, and a prediction error signal included in the coded stream. As described above, the difference vector is coded in the coded stream. The difference vector is a difference between the motion vector of a target block and a prediction vector predicted from the motion vector of an adjacent block thereof or a pixel of the adjacent block. When decoding the motion vector, the motion vector calculation unit 215 calculates a prediction vector from the motion vector of the adjacent block or the pixel of the adjacent block and adds the decoded difference vector to the prediction vector so as to decode the motion vector of the target block or a representative pixel thereof on which prediction coding has been performed.

The parallel-translation motion compensation prediction unit 204 generates a prediction signal from a motion vector between the target block in a target image and a reference block in a reference image translated from the target block and from an image signal of the reference block. The geometric-transformation motion compensation prediction unit 205 generates a prediction signal from a motion vector between the target block in the target image and the reference block in the reference image obtained by performing geometric transformation on the target block and from the image signal of the reference block.

As described above, pixels at the vertices of the target block are selected to be representative pixels, and the coded stream includes motion vectors of the respective representative pixels. The geometric-transformation motion compensation prediction unit 205 calculates respective motion vectors of pixels other than the plurality of representative pixels of the target block by interpolation using the motion vectors of the plurality of representative pixels. For example, the motion vectors of the pixels other than the representative pixels are calculated by arithmetic expressions shown in the above expressions (3) through (12).

In accordance with prediction method information decoded by the first coding bit string decoding unit 201, the switching control unit 214 specifies which one of a prediction method by the parallel-translation motion compensation prediction unit 204 or a prediction method by the geometric-transformation motion compensation prediction unit 205 is to be used for each target block in the target image.

A further detailed description is now given in the following. A coding bit string included in a coded stream generated by the image coding apparatus 100 according to the first embodiment is selectively input in the first coding bit string decoding unit 201, the second coding bit string decoding unit 202, and the third coding bit string decoding unit 203 via the input switch 209.

The first coding bit string decoding unit 201 decodes the coding bit string provided via the input switch 209 by entropy decoding such as arithmetic decoding so as to acquire the prediction method information. As described above, the prediction method information includes information indicating which method, either parallel translation or geometric transformation, is used for coding. In addition, in the case of the parallel-translation motion compensation, the prediction method information includes information indicating which one of the modes, 16×16, 16×8, 8×16, or 8×8 modes, is used. In the case of the geometric transformation, the prediction method information includes information indicating which one of modes is used for coding, the modes being a first mode for coding and/or decoding the respective motion vectors of four representative pixels a, b, c, and d, a second mode for coding and/or decoding the respective motion vectors of two representative pixels a and c in the vertical direction of the target block, a third mode for coding and/or decoding the respective motion vectors of two representative pixels a and b in the horizontal direction of the target block, and a fourth mode for coding and/or decoding the respective motion vectors of three representative pixels a, b, and c. The second coding bit string decoding unit 202 decodes the coding bit string provided via the input switch 209 by entropy decoding such as arithmetic decoding so as to acquire the difference vector. As described previously, a difference vector is a difference between a prediction vector calculated from the motion vector of an adjacent block and the motion vector of a decoding target block. When a motion vector used for motion compensation prediction by parallel translation and a motion vector used for motion compensation prediction by geometric transformation have been coded while being mixed, the motion vectors are decoded from mixed difference vectors according to the prediction method information also in the decoding side just as in the coding side.

Based on the prediction method information decoded by the first coding bit string decoding unit 201, a method, a reference image being used, and a block unit that are selected and combined for a decoding target block can be found, the method being intra coding, the motion compensation prediction by parallel translation, or the motion compensation prediction by geometric transformation.

In accordance with prediction method information provided from the first coding bit string decoding unit 201, the switching control unit 214 switches among the first prediction unit switch 210, the second prediction unit switch 211, the third prediction unit switch 212, and the fourth prediction unit switch 213. When a motion compensation prediction by parallel translation method is being selected as a method for predicting a target block, the switching control unit 214 switches over such that a path of the parallel-translation motion compensation prediction unit 204 is selected. When a motion compensation prediction method by geometric transformation is being selected, the switching control unit 214 switches over such that a path of the geometric-transformation motion compensation prediction unit 205 is selected.

In accordance with the prediction method information provided by the first coding bit string decoding unit 201, the motion vector calculation unit 215 calculates a prediction vector by predicting the motion vector of the target block from the motion vector of the surrounding adjacent block or a pixel of the adjacent block that has been already coded and decoded. Then, by adding the difference vector provided from the second coding bit string decoding unit 202 to the prediction vector, the motion vector is calculated. The motion vector calculation unit 215 provides the motion vector to the parallel-translation motion compensation prediction unit 204 or the geometric-transformation motion compensation prediction unit 205 via the second prediction unit switch 211. The calculation of the prediction vector by the motion vector calculation unit 215 is performed using the same method as that of the calculation of the prediction vector by the difference vector calculation unit 114 of the image coding apparatus 100. In the case of parallel-translation motion compensation prediction, the motion vector of the block can be acquired. In the case of geometric-transformation motion compensation prediction, the motion vector of a representative pixel of the block is calculated.

The parallel-translation motion compensation prediction unit 204 performs motion compensation prediction by parallel translation using a decoded image, which is to be used as a reference image, provided from the decoded image buffer 208 via the fourth prediction unit switch 213 and a decoded motion vector provided from the second coding bit string decoding unit 202 via the second prediction unit switch 211.

The geometric-transformation motion compensation prediction unit 205 calculates respective motion vectors of all pixels by interpolation using the decoded image, which is to be used as the reference image, provided from the decoded image buffer 208 via the fourth prediction unit switch 213 and respective decoded motion vectors of a plurality of representative pixels provided from the motion vector calculation unit 215 via the second prediction unit switch 211. The same processing method used in the geometric-transformation motion compensation prediction unit 103 of the image coding apparatus 100, which has been explained in reference to the above expressions (1) through (14), can be used at that time. The geometric-transformation motion compensation prediction unit 205 performs the motion compensation prediction by geometric transformation by performing motion compensation on a pixel-by-pixel basis according to the motion vector of each of these pixels.

The third coding bit string decoding unit 203 sequentially decodes a coding bit string provided via the input switch 209 so as to acquire a coded prediction error signal. The prediction error signal decoding unit 206 performs a decompression/decoding process such as inverse quantization, inverse orthogonal transformation, or the like on the coded prediction error signal provided from the third coding bit string decoding unit 203 so as to acquire a decoded prediction error signal.

The decoded image signal generation unit 207 generates an image signal from a prediction signal and a prediction error signal. More specifically, according to a prediction method specified by the switching control unit 214, the decoded image signal generation unit 207 superimposes the prediction error signal provided from the prediction error signal decoding unit 206 with the prediction signal provided from the parallel-translation motion compensation prediction unit 204 or the geometric-transformation motion compensation prediction unit 205 via the third prediction unit switch 212 so as to generate a decoded image signal. The decoded image signal generation unit 207 sequentially stores the decoded image signal in the decoded image buffer 208 in units of blocks.

Figure 10:
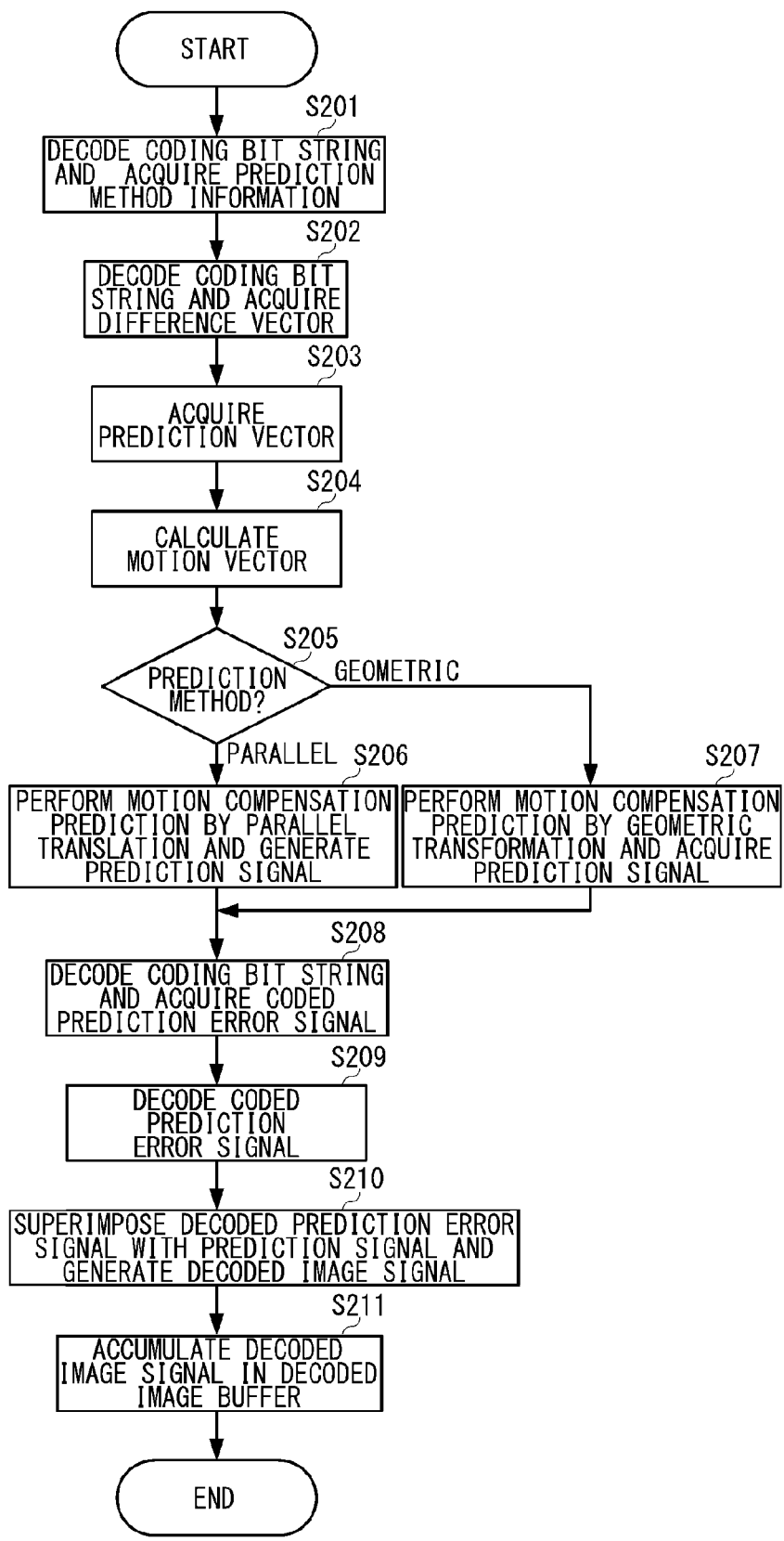
FIG. 10 is a flowchart illustrating the procedure of a macroblock decoding process in the image decoding apparatus according to the second embodiment of the present invention.

FIG. 10 is a flowchart illustrating the procedure of a macroblock decoding process in the image decoding apparatus 200 according to the second embodiment of the present invention. The first coding bit string decoding unit 201 decodes a coding bit string provided via the input switch 209 so as to acquire prediction method information (S201). The second coding bit string decoding unit 202 decodes a coding bit string provided via the input switch 209 so as to acquire a difference vector (S202). When the prediction method information indicates motion compensation prediction by geometric transformation, two through four difference vectors are decoded according to the prediction method information. In the first mode, respective difference vectors of four representative pixels a, b, c, and d respectively corresponding to four vertices a, b, c, and d are decoded. In the second mode, respective difference vectors of the representative pixels a and c respectively corresponding to the two vertices a and c are decoded. In the third mode, respective difference vectors of the representative pixels a and b respectively corresponding to the two vertices a and b are decoded. In the fourth mode, respective difference vectors of the three representative pixels a, b, and c respectively corresponding to the three vertices a, b, and c are decoded. The motion vector calculation unit 215 calculates a prediction vector from a surrounding block or a surrounding pixel (S203). The calculation is performed using the same method as that of the calculation of the prediction vector by the difference vector calculation unit 114 of the image coding apparatus 100. Further, according to the prediction method information provided from the first coding bit string decoding unit 201, the motion vector calculation unit 215 adds a difference vector provided from the second coding bit string decoding unit 202 to the prediction vector and calculates the motion vector of a target block or a target pixel (S204). Note that, regarding a representative point at which a difference vector has not been decoded in the second coding bit string decoding unit 202, a prediction vector is used as a motion vector.

The switching control unit 214 identifies the motion compensation prediction method for the target block according to the decoded prediction method information (S205). If the prediction method is the motion compensation prediction method by parallel translation (parallel in S205), the parallel-translation motion compensation prediction unit 204 performs, using the motion vector provided from the second coding bit string decoding unit 202, the motion compensation prediction by parallel translation on a decoded image signal, which is to be used as a reference image signal, provided from the decoded image buffer 208 (S206).

If the prediction method identified by the switching control unit 214 is the motion compensation prediction method by geometric transformation (geometric in S205), the geometric-transformation motion compensation prediction unit 205 performs, using the motion vector provided from the second coding bit string decoding unit 202, the motion compensation prediction by geometric transformation on a decoded image signal, which is to be used as a reference image signal, provided from the decoded image buffer 208 (S207).

The third coding bit string decoding unit 203 decodes a coding bit string provided via the input switch 209 so as to acquire a coded prediction error signal (S208). The decoded image signal generation unit 207 decodes the acquired prediction error signal (S209). The decoded image signal generation unit 207 superimposes the prediction error signal decoded by the prediction error signal decoding unit 206 with the prediction signal generated by the parallel-translation motion compensation prediction unit 204 or the geometric-transformation motion compensation prediction unit 205 so as to generate a decoded image signal (S210). The decoded image signal generation unit 207 accumulates the generated decoded image signal in the decoded image buffer 208 (S211). The decoded image signal accumulated in the decoded image buffer 208 is used as a reference image signal in the parallel-translation motion compensation prediction unit 204 and the geometric-transformation motion compensation prediction unit 205.

As explained above, according to the second embodiment, a coded stream generated by the image coding apparatus 100 according to the first embodiment can be efficiently decoded. With this, the above-stated effect achieved by the image coding apparatus 100 according to the first embodiment can be supported from the decoding side, and the effect can be secured. In other words, the effect of improving the efficiency of compressing the amount of coding can be supported from the decoding side in an image coding method where the motion compensation prediction by geometric transformation is used, and the effect can be secured. The effect of improving the efficiency of compressing the amount of coding can be also supported from the decoding side in an image coding method where the motion compensation prediction by parallel translation and the motion compensation prediction by geometric transformation are used together, and the effect can be secured. Concordance and compatibility with an existing image decoding apparatus are high so that the introduction cost can be reduced.

Described above is an explanation of the present invention based on the several embodiments. These embodiments are intended to be illustrative only, and it will be obvious to those skilled in the art that various modifications to constituting elements and processes could be developed and that such modifications are also within the scope of the present invention.

In the above-described embodiments, examples are described where pixels at the vertices of a target block (i.e., a macroblock partition or a sub-macroblock partition) or near the vertices are used as representative pixels and where the representative pixels are included in the target block (see FIG. 3). This aspect is not limited to this, and representative pixels may be outside of a target block.

Figure 11:
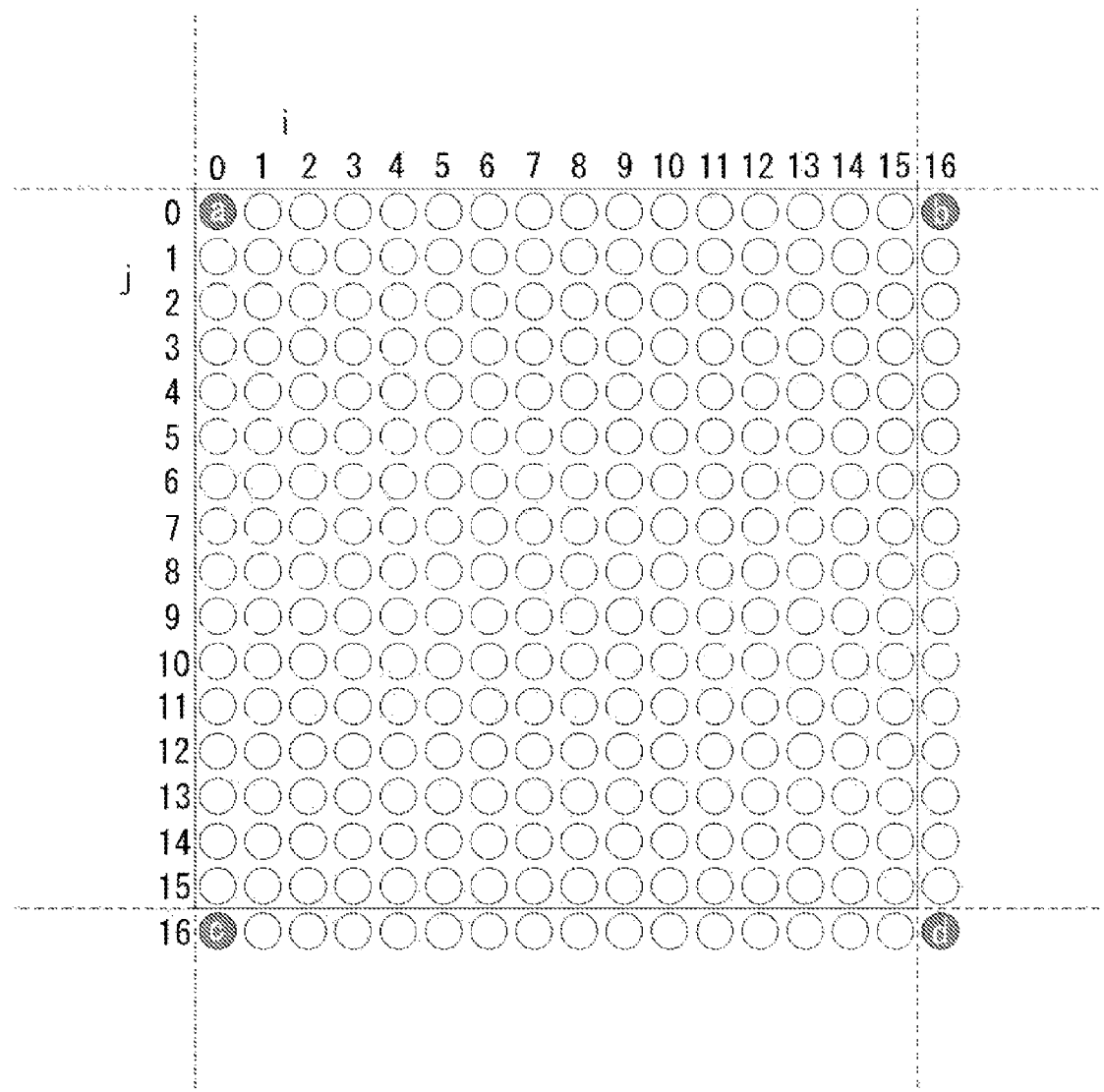
FIG. 11 is a diagram (2) for explaining representative pixels corresponding to four vertices of a target block.

FIG. 11 is a diagram (2) explaining representative pixels corresponding to four vertices of a target block. In an example shown in FIG. 11, a pixel a located at an upper left vertex and pixels b, c, and d located respectively near an upper right vertex, a lower left vertex, and a lower right vertex are set to be representative pixels a, b, c, and d, respectively. In FIG. 11, the representative pixels and non-representative pixels are shown by filled circles and open circles, respectively, and the representative pixels are set to be the pixel a (0,0) that exists at a vertex of the target block (a macroblock of 16×16 pixels in FIG. 11) and the pixel b (W,0), the pixel c (0,H), and the pixel d (W,H) that exist near the respective vertices. W represents a distance (unit is a pixel) between representative pixels in the horizontal direction (between the pixel a and the pixel b and between the pixel c and the pixel d), and H represents a distance (unit is a pixel) between representative pixels in the vertical direction (between the pixel a and the pixel c and between the pixel b and the pixel d). In the setting of the representative pixels shown in FIG. 11, W is 16 (pixels), and H is 16 (pixels). In the example, the coordinates of each pixel are shown by (i,j) where the coordinate in the horizontal direction is shown by i in units of one pixel and the coordinate in the vertical direction is shown by j in units of one pixel. The uppermost left pixel in the macroblock is set to be the original point (0,0), and the rightward direction and the leftward direction are set to be directions of a positive increase. The first representative pixel a at the upper left is included in the target block. However, the second representative pixel b at the upper right, the third representative pixel c at the lower left, and the fourth representative pixel d at the lower right are not included in the target block.

In that case, a motion vector V(i,j) of another pixel P(i,j) is calculated from the respective motion vectors Va, Vb, Vc, and Vd of the four representative pixels a, b, c, and d by the above expression (3).

In the above expression (3), the division is done by W*H=225 (15×15) in the setting of the representative pixels shown in FIG. 3, and the division is done by W*H=256 (=16×16) in the setting of the representative pixels shown in FIG. 11. When the division is done by 256, which is a power of two, the division can be achieved by a bit shift operation where a right shift by 8 bits occurs. Thus, the throughput can be reduced, allowing for easy implementation on hardware. By setting an interval between representative pixels to be a number, which is a power of two, the division can be achieved by a bit shift operation. The representative pixels not included in the target block may be outside of a screen and may be virtual pixels that do not exist.

Similarly, in the case of the setting of representative pixels shown in FIG. 11, calculation can be performed using the above expressions (1), (2), and (4) through (12) just like the setting of representative pixels shown in FIG. 3.

In the above expressions (4), (5), (10), and (12), the division is done by W=15 in the setting of the representative pixels shown in FIG. 3, and the division is done by W=6 in the setting of the representative pixels shown in FIG. 11. Further, in the above expressions (6), (7), and (9), the division is done by H=15 in the setting of the representative pixels shown in FIG. 3, and the division is done by H=16 in the setting of the representative pixels shown in FIG. 11. As in the case described above, when the division is done by 16, which is a power of two, the division can be achieved by a bit shift operation where a right shift by 4 bits occurs. Thus, the throughput can be reduced, allowing for easy implementation on hardware. By setting an interval between representative pixels to be a power of two, the division can be also converted to a bit shift operation in this case.

Figure 12:
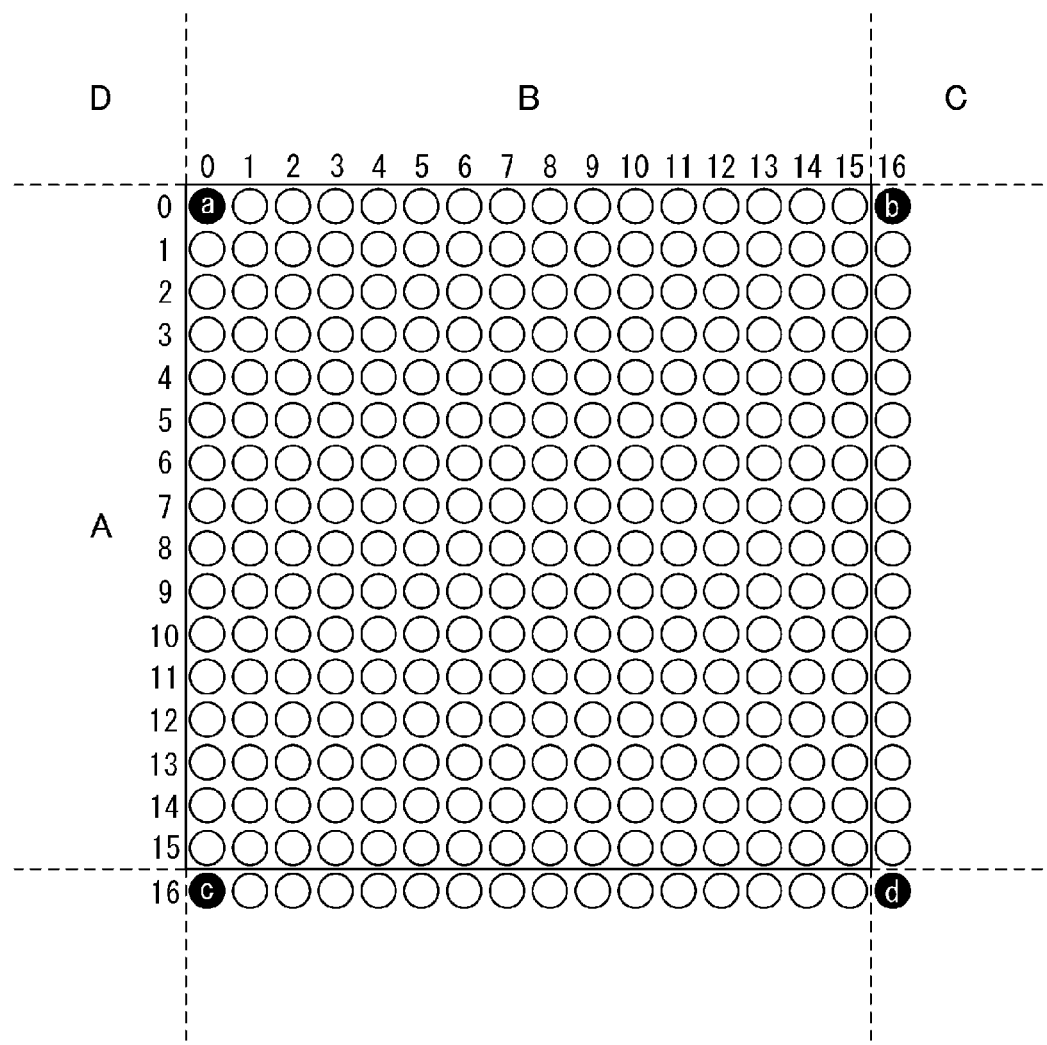
FIG. 12 is a diagram (2) for explaining a prediction vector prediction method when a target block is subject to motion compensation prediction by geometric transformation.

Regarding a method for calculating a prediction vector, the same method as the method explained using FIG. 7 can be also employed in the setting of the representative pixels shown in FIG. 11. Based on the condition that the setting of representative pixels shown in FIG. 11 is used, an explanation is more specifically given using FIG. 12 regarding prediction for a motion vector when motion compensation prediction by geometric transformation is selected for both a coding target block and an adjacent block thereof. When an interval between representative pixels is set to be 16 as shown in FIGS. 11 and 12, each of the representative pixels b, c, and d will be outside of a target block by one pixel. Therefore, the representative pixel a of the target block also serves as a representative pixel b of a left-adjacent block A, a representative pixel c of a top-adjacent block B, and a representative pixel d of an upper-left adjacent block D. The representative pixel b of the target block also serves as a representative pixel d of the top-adjacent block B and a representative pixel c of an upper-right adjacent block C. The representative pixel c of the target block also serves as a representative pixel d of the left-adjacent block A. Respective prediction vectors of a first representative pixel a, a second representative pixel b, and a third representative pixel c are predicted from the motion vector of an adjacent block.

In FIG. 12, a prediction vector of the first representative pixel a of a coding target block is calculated in reference to the motion vector of a pixel at an upper-right vertex of a left-adjacent block A, the motion vector of a pixel at a lower-left vertex of a top-adjacent block B, and the motion vector of a pixel at a lower-right vertex of an upper left adjacent block D among surrounding blocks that refer to the same image as a reference image of the target block out of already-coded adjacent blocks. A prediction vector of the second representative pixel b is selected according to a predetermined rule from the motion vector of a pixel at a lower-right vertex of the top-adjacent block B, the motion vector of a pixel at a lower-left vertex of the upper-right adjacent block C, and the motion vector of the first representative pixel a of the target block. As a prediction vector of the third representative pixel c, the motion vector of a pixel at a lower-right vertex of a left-adjacent block A is employed. As described above, a prediction vector of the fourth representative pixel d can be calculated by the above expression (13) or (14) from respective motion vectors Va, Vb, and Vc of the first representative pixel a, the second representative pixel b, and the third representative pixel c.

Figure 13:
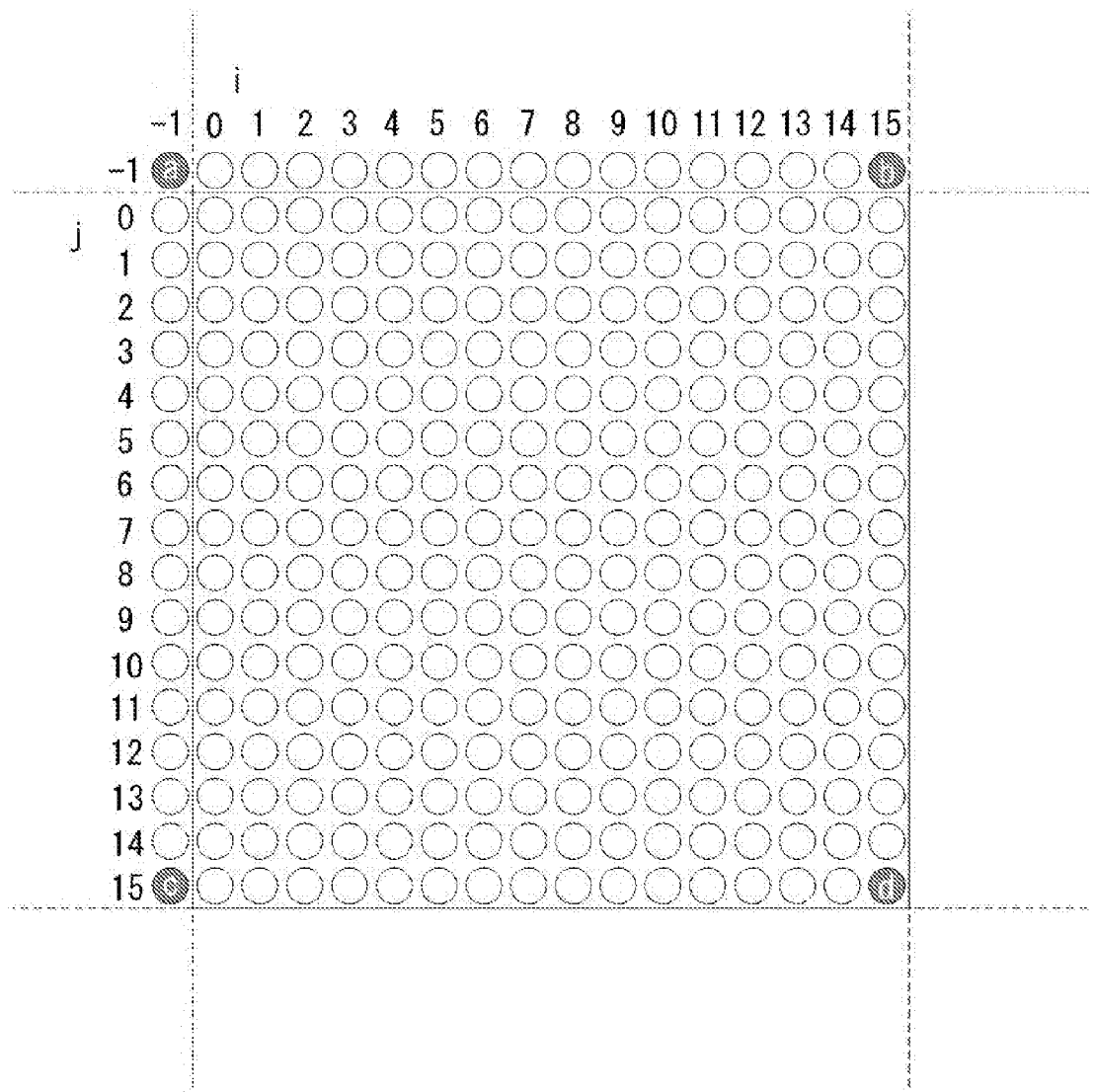
FIG. 13 is a diagram (3) for explaining representative pixels corresponding to four vertices of a target block.

FIG. 13 is a diagram (3) explaining representative pixels corresponding to four vertices of a target block. In an example shown in FIG. 13, pixels a, b, and c located near an upper-left vertex, an upper-right vertex, and a lower-left vertex, respectively, and a pixel d located at a lower-right vertex are set to be representative pixels a, b, c, and d, respectively. In an example of FIG. 13, the representative pixels and non-representative pixels are shown by filled circles and open circles, respectively, and the representative pixels are set to be the pixel a $(-1,-1)$, the pixel b $(W-1,-1)$, and the pixel c $(-1,H-1)$ that exist near respective vertices of a target block (a macroblock of 16×16 pixels in FIG. 13), and the pixel d $(W-1,H-1)$ that exists at a vertex of the target block. W represents a distance (unit is a pixel) between representative pixels in the horizontal direction (between the pixel a and the pixel b and between the pixel c and the pixel d), and H represents a distance (unit is a pixel) between representative pixels in the vertical direction (between the pixel a and the pixel c and between the pixel b and the pixel d). In the setting of the representative pixels shown in FIG. 11, W is 16 (pixels), and H is 16 (pixels). In the example, the coordinates of each pixel are shown by (i,j) where the coordinate in the horizontal direction is shown by i in units of one pixel and the coordinate in the vertical direction is shown by j in units of one pixel. The uppermost left pixel in the macroblock is set to be the original point (0,0), and the rightward direction and the leftward direction are set to be directions of a positive increase. The fourth representative pixel d at the lower right is included in the target block. However, the representative pixels a, b, and c at the upper left, the upper right, and the lower left, respectively, are not included in the target block.

In that case, a motion vector V(i,j) of another pixel P(i,j) is calculated from the respective motion vectors Va, Vb, Vc, and Vd of the four representative pixels a, b, c, and d by the following expression (15) instead of the above expression (3).

$$V(i,j)=[(W-i-1)(H-j-1)Va+(i+1)(H-j-1)Vb+(W-i-1)(j+1)*Vc+(i+1)*(j+1)*Vd]/(W*H) \quad \text{Expression (15)}$$

The division is also done by W*H=256 (=16×16) in the above expression (15). When the division is done by 256, which is a power of two, the division can be achieved by a bit shift operation where a right shift by 8 bits occurs. Thus, the throughput can be reduced, allowing for easy implementation on hardware. By setting an interval between representative pixels to be a number, which is a power of two, the division can be achieved by a shift operation. The representative pixels not included in the target block may be outside of a screen and may be virtual pixels that do not exist.

In the above-described embodiments, pixels at the vertices of a target block (i.e., a macroblock partition or a sub-macroblock partition) or near the vertices are used as representative pixels. However, representative pixels are not limited to this, and interpolation pixels at the vertices or at coordinates corresponding to the vertices may be used as representative pixels.

Figure 14:
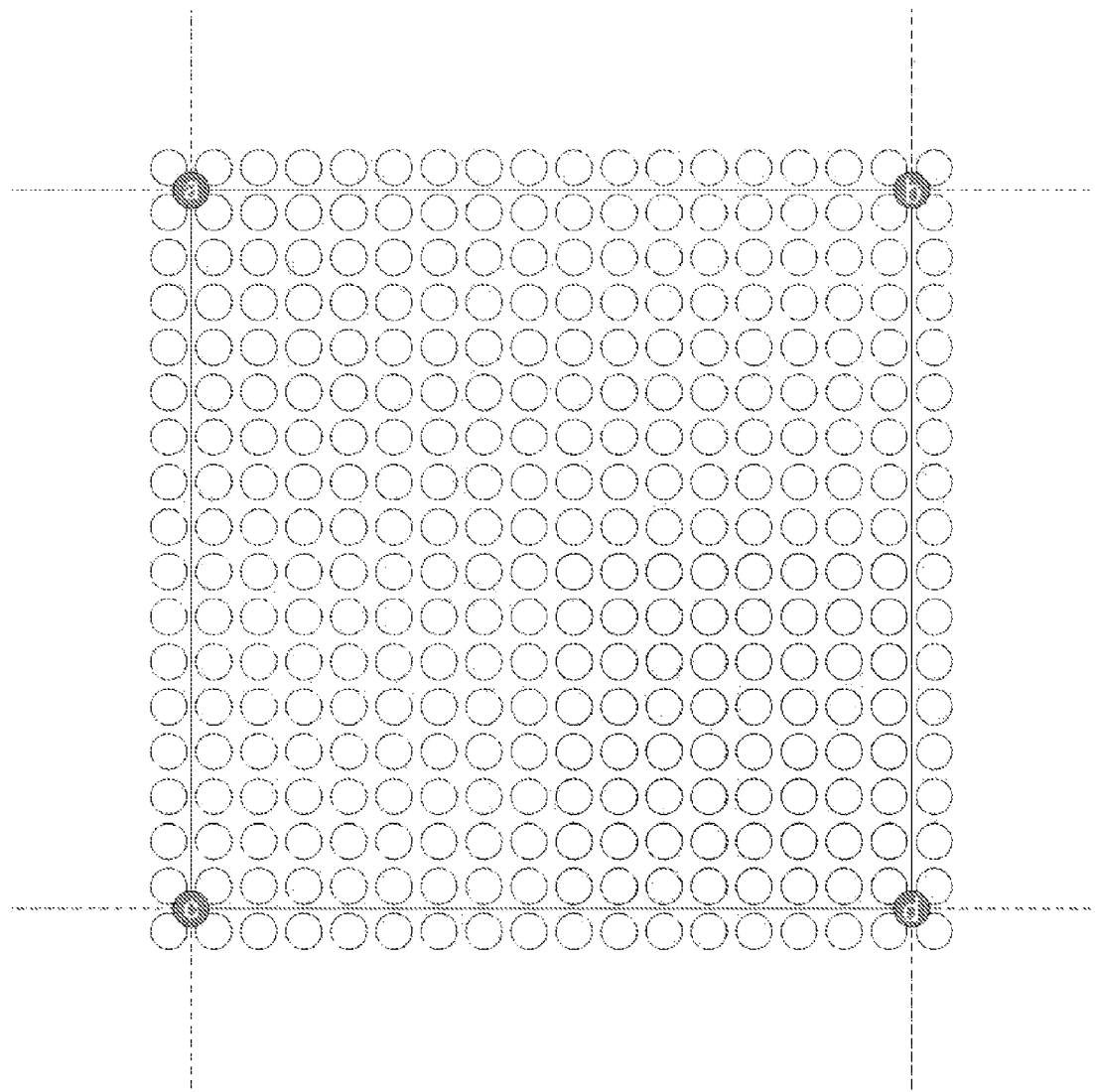
FIG. 14 is a diagram (4) for explaining representative pixels corresponding to four vertices of a target block.

FIG. 14 is a diagram (4) for explaining representative pixels corresponding to four vertices of a target block. In an example shown in FIG. 14, interpolation pixels a, b, c, and d corresponding to the respective locations at an upper left vertex, an upper right vertex, a lower left vertex, and a lower right vertex are set to be representative pixels. In addition to setting a pixel that actually exists to be a representative pixel as in the examples described thus far (FIGS. 3, 11, and 13), a pixel that exists at an interpolated position may be set to be a representative pixel as in this example (FIG. 14), and the motion vector of the actually existing pixel may be calculated by interpolation from the motion vector of the representative pixel.

In a method for predicting a motion vector explained in the above FIGS. 5, 6, 7, and 12, instead of directly using a motion vector Vabcd of an adjacent block or a pixel of the adjacent block as a prediction vector candidate, a motion vector value Vabcd' calculated by scaling Vabcd according to a distance (time) between a coding target image and a reference image may be used as a prediction vector candidate. The scaled motion vector value Vabcd' is a motion vector value scaled according to a distance (time) T1 between the coding target image and a reference image indicated by the motion vector of the coding target block and to a distance (time) T2 between the coding target image and a reference image indicated by the motion vector Vabcd of an adjacent block or a pixel of the adjacent block. The scaled motion vector value Vabcd' is calculated by the following expression (16).

$$Vabcd'=Vabcd*(T1/T2) \quad \text{Expression (16)}$$

When a reference image referred to in motion compensation prediction of the coding target block and a reference image referred to in motion compensation prediction of an adjacent block are different from each other, a difference is caused in the values of the respective motion vectors even for the same motion, and the motion vectors are thus scaled to overcome the mismatch. For example, if an object does not become deformed and has uniform motion, the size of the motion vector becomes larger as an frame interval becomes longer. According to a ratio of a frame interval T1 and a frame interval T2 each between a coding target image and a reference image, the motion vector Vabcd of an adjacent block (a pixel of the adjacent block) is scaled so as to calculate Vabcd'.

When the reference image referred to in the motion compensation prediction of the coding target block and the reference image referred to in the motion compensation prediction of an adjacent block are different from each other and when both of the two reference images correspond to those displayed in the past or the future in display order in view of the coding target image, in other words, when the two reference images are located on the same side in view of the coding target image, scaling is performed in the same direction. In order to perform the scaling in the same direction, the scaling is performed using a positive value. By this scaling process, a motion vector that has the same orientation but is different in size is used as a prediction vector. FIG. 15 is a diagram for explaining an example of a process of scaling a motion vector value. In FIG. 15, when a reference image for a coding target block of a coding target image is an image Ref2 and when a reference image for motion compensation prediction of an adjacent block (a pixel of the adjacent block) is an image Ref3, T1:T2=2:3. Thus, a motion vector Vabcd of the adjacent block (the pixel of the adjacent block) that refers to the image Ref3 is scaled to ⅔. With this, the value of the motion vector becomes close to a motion vector value obtained if motion compensation prediction is performed by the adjacent block (the pixel of the adjacent block) in reference to the image Ref2. As a result, the value of the motion vector becomes close to the value of the motion vector of the coding target block that refers to the image Ref2. In the example shown in FIG. 15, when a reference image used at the time of the compensation prediction of the adjacent block is Ref3 and the value of the motion vector thereof is (24,−9), a value (16,−6) obtained by scaling the value of the motion vector to ⅔ is used for a prediction vector candidate.

When the reference image referred to in the motion compensation prediction of the coding target block and the reference image referred to in the motion compensation prediction of the adjacent block are different from each other and when the two reference images correspond to one displayed in the past and one displayed in the future, respectively, in display order in view of the coding target image, in other words, when the two reference images are located one on each side of the coding target image, scaling is performed in the opposite direction. In order to perform the scaling in the opposite direction, the scaling is performed using a negative value. By this scaling process, a motion vector that has the opposite orientation and is different in size is used as a prediction vector. In FIG. 15, when a reference image for a coding target block of a coding target image is an image Ref2 and when a reference image for motion compensation prediction of an adjacent block (a pixel of the adjacent block) is an image Ref5, T1:T2=2:−1. Thus, a motion vector Vabcd of the adjacent block (the pixel of the adjacent block) that refers to the image Ref3 is scaled to 2/(−1)=−2 times. With this, the value of the motion vector becomes close to a motion vector value obtained if motion compensation prediction is performed by the adjacent block (the pixel of the adjacent block) in reference to the image Ref2. As a result, the value of the motion vector becomes close to the value of the motion vector of the coding target block that refers to the image Ref2. In the example shown in FIG. 15, when a reference image used at the time of the compensation prediction of the adjacent block is Ref5 and the value of the motion vector thereof is (−8,3), a value (16,−6) obtained by scaling the value of the motion vector to "−2" times is used for a prediction vector candidate.

In a method for predicting a motion vector explained in the above FIGS. 5, 6, 7, and 12, an L0 motion vector used for L0 prediction or bi-predictive prediction and an L1 motion vector used for L1 prediction or bi-predictive prediction are treated separately in a B picture. In other words, a candidate for a prediction vector of an L0 motion vector is calculated from an L0 motion vector of an adjacent block or a pixel of the adjacent block, and a candidate for a prediction vector of an L1 motion vector is calculated from an L1 motion vector of the adjacent block or a pixel of the adjacent block. When the adjacent block is subject to unidirectional prediction of the L0 prediction or the L1 prediction, either one of the L0 motion vector or the L1 motion vector exists. If the L0 motion vector of the adjacent block or the pixel of the adjacent block cannot be obtained due to the adjacent block being subject to the L1 prediction when calculating the candidate for the prediction vector of the L0 motion vector, the L1 motion vector can be scaled by the previously-stated scaling process and then used as a candidate for the prediction vector of the L0 motion vector. Similarly, if the L1 motion vector of the adjacent block or the pixel of the adjacent block cannot be obtained due to the adjacent block being subject to the L0 prediction when calculating the candidate for the prediction vector of the L1 motion vector, the L0 motion vector can be scaled by the previously-stated scaling process and then used as a candidate for the prediction vector of the L1 motion vector.

In the above-stated embodiments, an example is explained where the shape of a target block is square. Regarding this, the shape of a target block may be another shape such as triangle, parallelogram, trapezoid, or the like. In this case, the above representative pixels are preferably set at the vertices or near the vertices of a corresponding shape.

What is claimed is:

1. An image coding apparatus for coding a video image comprising:
   a geometric-transformation motion compensation prediction unit configured to calculate, for each of a plurality of prediction modes, a motion vector and a prediction signal between a target block in a target image and a reference block in a reference image obtained by performing geometric transformation on the target block, to select pixels located at vertices constituting the target block, pixels located near the vertices, or interpolation pixels located near the vertices as representative pixels corresponding to the vertices in each prediction mode, to calculate the respective motion vectors of these representative pixels, and to calculate the respective motion vectors of pixels other than the representative pixels by interpolation using the motion vectors of the representative pixels so as to calculate the prediction signal;
   a prediction method determination unit configured to select any one of the plurality of prediction modes by the geometric-transformation motion compensation prediction unit for each target block in the target image;
   a prediction error signal generation unit configured to calculate a difference between a prediction signal calculated in a prediction mode selected by the prediction method determination unit and an image signal of the target block so as to generate a prediction error signal;
   a difference vector generation unit configured to calculate, using motion vectors inside and outside of the target block, prediction motion vectors of the respective motion vectors of the representative pixels calculated in the prediction mode selected by the prediction method determination unit and to calculate differences between the prediction motion vectors and the motion vectors of the representative pixels calculated in the selected prediction mode so as to generate respective difference motion vectors of the representative pixels; and a coding unit configured to code prediction method information for identifying the prediction mode selected by the prediction method determination unit, the difference motion vectors generated by the difference vector generation unit, and the prediction error signal generated by the prediction error signal generation unit, wherein the target block is an quadrangle region, and wherein the geometric-transformation motion compensation prediction unit includes at least two prediction modes out of four prediction modes:

a first mode for calculating respective motion vectors, subject to coding, of four representative pixels of the target block;

a second mode for calculating respective motion vectors, subject to coding, of two representative pixels in the vertical direction of the target block;

a third mode for calculating respective motion vectors, subject to coding, of two representative pixels in the horizontal direction of the target block; and a fourth mode for calculating respective motion vectors, subject to coding, of three representative pixels of the target block.

2. The image coding apparatus according to claim 1, wherein the geometric-transformation motion compensation prediction unit calculates the motion vector of a first representative pixel corresponding to the upper left vertex of the quadrangle target block, the motion vector of a second representative pixel corresponding to the upper right vertex, and the motion vector of a third representative pixel corresponding to the lower left vertex in the fourth mode.

3. The image coding apparatus according to claim 1, wherein the difference vector generation unit calculates a prediction motion vector of a fourth representative pixel corresponding to the lower right vertex by adding, to the motion vector of the third representative pixel corresponding to the lower left vertex, a difference obtained by subtracting the value of the motion vector of the first representative pixel corresponding to the upper left vertex from the value of the motion vector of the second representative pixel corresponding to the upper right vertex of the quadrangle target block when the first mode is selected by the prediction method determination unit.

4. The image coding apparatus according to claim 1, wherein the difference vector generation unit calculates a prediction motion vector of the fourth representative pixel corresponding to the lower right vertex by adding, to the motion vector of the second representative pixel corresponding to the upper right vertex, a difference obtained by subtracting the value of the motion vector of the first representative pixel corresponding to the upper left vertex from the value of the motion vector of the third representative pixel corresponding to the lower left vertex of the quadrangle target block when the first mode is selected by the prediction method determination unit.

5. The image coding apparatus according to claim 1, further comprising:

a parallel-translation motion compensation prediction unit configured to generate a motion vector and a prediction signal between a target block in a target image and a reference block in a reference image translated from the target block, wherein the prediction method determination unit determines which one of a prediction method by the parallel-translation motion compensation prediction unit or a prediction method by the geometric-transformation motion compensation prediction unit is to be employed for each target block in the target image and selects a prediction mode in the employed prediction method, and wherein the difference vector generation unit generates a prediction motion vector of the motion vector of the target block, according to the prediction mode and a motion compensation prediction method of an adjacent block adjacent to the target block, from the motion vector of the adjacent block or a pixel included in the adjacent block and calculates, when the prediction method by the parallel-translation motion compensation prediction unit is employed by the prediction method determination unit, a difference between the motion vector of the target block calculated in the prediction mode selected by the prediction method determination unit and the prediction motion vector of the motion vector of the target block so as to generate a difference motion vector.

6. An image coding method for coding a video image comprising:

performing geometric-transformation motion compensation prediction for calculating, for each of a plurality of prediction modes, a motion vector and a prediction signal between a target block in a target image and a reference block in a reference image obtained by performing geometric transformation on the target block, for selecting pixels located at vertices constituting the target block, pixels located near the vertices, or interpolation pixels located near the vertices as representative pixels corresponding to the vertices in each prediction mode, for calculating the respective motion vectors of these representative pixels, and for calculating the respective motion vectors of pixels other than the representative pixels by interpolation using the motion vectors of the representative pixels so as to calculate the prediction signal;

performing prediction method determination for selecting any one of the plurality of prediction modes by the geometric-transformation motion compensation prediction for each target block in the target image;

performing prediction error signal generation for calculating a difference between a prediction signal calculated in a prediction mode selected by the prediction method determination and an image signal of the target block so as to generate a prediction error signal;

performing difference vector generation for calculating, using motion vectors inside and outside of the target block, prediction motion vectors of the respective motion vectors of the representative pixels calculated in the prediction mode selected by the prediction method determination and for calculating differences between the prediction motion vectors and the motion vectors of the representative pixels calculated in the selected prediction mode so as to generate respective difference motion vectors of the representative pixels; and coding prediction method information for identifying the prediction mode selected by the prediction method determination, the difference motion vectors generated by the difference vector generation, and the prediction error signal generated by the prediction error signal generation, wherein the target block is an quadrangle region, and wherein the geometric-transformation motion compensation prediction includes at least two prediction modes out of four prediction modes:

a first mode for calculating respective motion vectors, subject to coding, of four representative pixels of the target block;

a second mode for calculating respective motion vectors, subject to coding, of two representative pixels in the vertical direction of the target block;

a third mode for calculating respective motion vectors, subject to coding, of two representative pixels in the horizontal direction of the target block; and a fourth mode for calculating respective motion vectors, subject to coding, of three representative pixels of the target block.

7. A non-transitory computer readable medium storing an image coding program for coding a video image comprising:

a geometric-transformation motion compensation prediction module configured to calculate, for each of a plurality of prediction modes, a motion vector and a prediction signal between a target block in a target image and a reference block in a reference image obtained by performing geometric transformation on the target block, to select pixels located at vertices constituting the target block, pixels located near the vertices, or interpolation pixels located near the vertices as representative pixels corresponding to the vertices in each prediction mode, to calculate the respective motion vectors of these representative pixels, and to calculate the respective motion vectors of pixels other than the representative pixels by interpolation using the motion vectors of the representative pixels so as to calculate the prediction signal;

a prediction method determination module configured to select any one of the plurality of prediction modes by the geometric-transformation motion compensation prediction module for each target block in the target image;

a prediction error signal generation module configured to calculate a difference between a prediction signal calculated in a prediction mode selected by the prediction method determination module and an image signal of the target block so as to generate a prediction error signal;

a difference vector generation module configured to calculate, using motion vectors inside and outside of the target block, prediction motion vectors of the respective motion vectors of the representative pixels calculated in the prediction mode selected by the prediction method determination module and to calculate differences between the prediction motion vectors and the motion vectors of the representative pixels calculated in the selected prediction mode so as to generate respective difference motion vectors of the representative pixels; and a coding module configured to code prediction method information for identifying the prediction mode selected by the prediction method determination module, the difference motion vectors generated by the difference vector generation module, and the prediction error signal generated by the prediction error signal generation module, wherein the target block is an quadrangle region, wherein the geometric-transformation motion compensation prediction module includes at least two prediction modes out of four prediction modes:

a first mode for calculating respective motion vectors, subject to coding, of four representative pixels of the target block;

a second mode for calculating respective motion vectors, subject to coding, of two representative pixels in the vertical direction of the target block;

a third mode for calculating respective motion vectors, subject to coding, of two representative pixels in the horizontal direction of the target block; and a fourth mode for calculating respective motion vectors, subject to coding, of three representative pixels of the target block.

8. An image decoding apparatus comprising:

a decoding unit configured to decode prediction method information for identifying a prediction mode, difference motion vectors of respective representative pixels according to the prediction mode, and a prediction error signal, which are included in a coded stream coded using motion compensation prediction by geometric transformation;

a motion vector generation unit configured to calculate, using motion vectors inside and outside of the target block, prediction motion vectors of the respective motion vectors of the representative pixels in accordance with the prediction mode identified by the prediction method information and to generate the respective motion vectors of the representative pixels by adding respective difference motion vectors of the representative pixels to the respective prediction motion vectors;

a geometric-transformation motion compensation prediction unit configured to generate a prediction signal from respective motion vectors of the representative pixels between the target block in a target image and a reference block in a reference image obtained by performing geometric transformation on the target block, from respective motion vectors of pixels other than the representative pixels calculated by interpolation using the motion vectors of the representative pixels, and from an image signal of the reference block;

an image signal generation unit configured to generate an image signal from the prediction signal and the prediction error signal decoded by the decoding unit; and a control unit configured to specify, in reference to the prediction method information decoded by the decoding unit, which one of a plurality of prediction modes by the geometric-transformation motion compensation prediction unit is to be used for each target block in the target image, wherein pixels located at vertices constituting the target block, pixels located near the vertices, or interpolation pixels located near the vertices are selected as the representative pixels, wherein the target block is an quadrangle region, and wherein the plurality of prediction modes include at least two prediction modes out of four prediction modes:

a first mode for using respective motion vectors of four representative pixels of the target block;

a second mode for using respective motion vectors of two representative pixels in the vertical direction of the target block;

a third mode for using respective motion vectors of two representative pixels in the horizontal direction of the target block; and a fourth mode for using respective motion vectors of three representative pixels of the target block.

9. The image decoding apparatus according to claim 8, wherein the difference motion vector of a first representative pixel corresponding to the upper left vertex of the quadrangle target block, the difference motion vector of a second representative pixel corresponding to the upper right vertex, and the difference motion vector of a third representative pixel corresponding to the lower left vertex are included as the respective difference motion vectors of the representative pixels in the coded stream when the prediction mode identified by the prediction method information is the fourth mode.

10. The image decoding apparatus according to claim 8, wherein the motion vector generation unit calculates the prediction motion vector of the fourth representative pixel corresponding to the lower right vertex of the quadrangle target block by adding, to the motion vector of the third representative pixel corresponding to the lower left vertex, a difference obtained by subtracting the value of the motion vector of the first representative pixel corresponding to the upper left vertex from the value of the motion vector of the second representative pixel corresponding to the upper right vertex in the first.

11. The image decoding apparatus according to claim 8, wherein the motion vector generation unit calculates the prediction motion vector of the fourth representative pixel corresponding to the lower right vertex of the quadrangle target block by adding, to the motion vector of the second representative pixel corresponding to the upper right vertex, a difference obtained by subtracting the value of the motion vector of the first representative pixel corresponding to the upper left vertex from the value of the motion vector of the third representative pixel corresponding to the lower left vertex in the first.

12. The image decoding apparatus according to claim 8, further comprising:
a parallel-translation motion compensation prediction unit configured to generate a prediction signal from a motion vector between the target block in the target image and the reference block in the reference image translated from the target block and from the image signal of the reference block,
wherein the control unit specifies a prediction method by the parallel-translation motion compensation prediction unit or a prediction method by the geometric-transformation motion compensation prediction unit is to be used for each target block in the target image in reference to the prediction method information decoded by the decoding unit,
wherein data included in the coded stream is coded using the motion compensation prediction by parallel translation together with the motion compensation prediction by geometric transformation, and
wherein the motion vector generation unit generates a prediction motion vector of the target block, according to the prediction mode and a motion compensation prediction method of an adjacent block adjacent to the target block, from the motion vector of the adjacent block or a pixel included in the adjacent block.

13. An image decoding method comprising:
decoding prediction method information for identifying a prediction mode, difference motion vectors of respective representative pixels according to the prediction mode, and a prediction error signal, which are included in a coded stream coded using motion compensation prediction by geometric transformation;
performing motion vector generation for calculating, using motion vectors inside and outside of a target block, prediction motion vectors of the respective motion vectors of the representative pixels in accordance with the prediction mode identified by the prediction method information and for generating the respective motion vectors of the representative pixels by adding respective difference motion vectors of the representative pixels to the respective prediction motion vectors;
performing geometric-transformation motion compensation prediction for generating a prediction signal from the respective motion vectors of the representative pixels between the target block in the target image and the reference block in the reference image obtained by performing geometric transformation on the target block, from respective motion vectors of pixels other than the representative pixels calculated by interpolation using the motion vectors of the representative pixels, and from an image signal of the reference block;
performing image signal generation for generating an image signal from the prediction signal and the prediction error signal decoded by the decoding; and
specifying, in reference to the prediction method information decoded by the decoding, which one of a plurality of prediction modes by the geometric-transformation motion compensation prediction is to be used for each target block in the target image,
wherein pixels located at vertices constituting the target block, pixels located near the vertices, or interpolation pixels located near the vertices are selected as the representative pixels,
wherein the target block is an quadrangle region,
wherein the plurality of prediction modes include at least two prediction modes out of four prediction modes:
a first mode for using respective motion vectors of four representative pixels of the target block;
a second mode for using respective motion vectors of two representative pixels in the vertical direction of the target block;
a third mode for using respective motion vectors of two representative pixels in the horizontal direction of the target block; and
a fourth mode for using respective motion vectors of three representative pixels of the target block.

14. A non-transitory computer readable medium storing an image decoding program comprising:
a decoding module configured to decode prediction method information for identifying a prediction mode, difference motion vectors of respective representative pixels according to the prediction mode, and a prediction error signal, which are included in a coded stream coded using motion compensation prediction by geometric transformation;
a motion vector generation module configured to calculate, using motion vectors inside and outside of the target block, prediction motion vectors of the respective motion vectors of the representative pixels in accordance with the prediction mode identified by the prediction method information and to generate the respective motion vectors of the representative pixels by adding respective difference motion vectors of the representative pixels to the respective prediction motion vectors;
a geometric-transformation motion compensation prediction module configured to generate a prediction signal from the respective motion vectors of the representative pixels between the target block in the target image and the reference block in the reference image obtained by performing geometric transformation on the target block, from respective motion vectors of pixels other than the representative pixels calculated by interpolation using the motion vectors of the representative pixels, and from an image signal of the reference block;

an image signal generation module configured to generate an image signal from the prediction signal and the prediction error signal decoded by the decoding module; and a control module configured to specify, in reference to the prediction method information decoded by the decoding module, which one of a plurality of prediction modes by the geometric-transformation motion compensation prediction module is to be used for each target block in the target image, wherein pixels located at vertices constituting the target block, pixels located near the vertices, or interpolation pixels located near the vertices are selected as the representative pixels, wherein the target block is an quadrangle region, wherein the plurality of prediction modes include at least two prediction modes out of four prediction modes:

a first mode for using respective motion vectors of four representative pixels of the target block;

a second mode for using respective motion vectors of two representative pixels in the vertical direction of the target block;

a third mode for using respective motion vectors of two representative pixels in the horizontal direction of the target block; and a fourth mode for using respective motion vectors of three representative pixels of the target block.

* * * * *